(12) United States Patent
Kim et al.

(10) Patent No.: US 10,820,188 B2
(45) Date of Patent: Oct. 27, 2020

(54) ELECTRONIC DEVICE AND METHOD FOR PROVIDING COMMUNICATION SERVICE BASED ON SUBSCRIBER IDENTITY INFORMATION IN ELECTRONIC DEVICE

(71) Applicant: SAMSUNG ELECTRONICS CO., LTD., Suwon-si, Gyeonggi-do (KR)

(72) Inventors: Sungoh Kim, Suwon-si (KR); Jeongdon Kang, Suwon-si (KR); Jaehyeon Seo, Suwon-si (KR); Sangsoo Lee, Suwon-si (KR); Sanghwi Lee, Suwon-si (KR); Jieun Jung, Suwon-si (KR); Sunmin Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/295,363

(22) Filed: Mar. 7, 2019

(65) Prior Publication Data
US 2019/0281442 A1 Sep. 12, 2019

(30) Foreign Application Priority Data
Mar. 8, 2018 (KR) .................. 10-2018-0027296

(51) Int. Cl.
*H04W 8/18* (2009.01)
*H04L 29/06* (2006.01)
(Continued)

(52) U.S. Cl.
CPC .......... *H04W 8/183* (2013.01); *H04B 17/318* (2015.01); *H04L 63/102* (2013.01);
(Continued)

(58) Field of Classification Search
CPC ..... H04W 8/183; H04W 48/18; H04W 48/16; H04W 8/20; H04W 4/50; H04W 76/30;
(Continued)

(56) References Cited

U.S. PATENT DOCUMENTS 9,693,220 B1 * 6/2017 Daniel .................. H04W 8/183
2015/0296363 A1 * 10/2015 Kaikkonen ....... H04M 15/8044
455/406
(Continued)

FOREIGN PATENT DOCUMENTS

KR 10-2014-0075603 6/2014
KR 10-2016-0010236 1/2016

OTHER PUBLICATIONS

Extended Search Report dated Jul. 31, 2019 in counterpart European Patent Application No. 19161410.6.

*Primary Examiner* — Joseph E Dean, Jr.
(74) *Attorney, Agent, or Firm* — Nixon & Vanderhye P.C.

(57) ABSTRACT

Various example embodiments relating to an electronic device are described. According to an example embodiment, an electronic device may include: a display; communication circuitry; a memory comprising an embedded subscriber identity module configured to store first information associated with a first communication connection for downloading first subscriber identity information by accessing at least one communication service providing server; and a processor operatively connected to the display, the communication circuitry, and the memory, wherein the processor may be configured to control the electronic device to establish the first communication connection for downloading first data including the first subscriber identity information based on the first information using the communication circuitry, to terminate the first communication connection and transmit and/or receive the first data by establishing a second communication connection based on a second subscriber identity (Continued)

information upon receiving a request to transmit and/or receive data not including the first subscriber identity information during the first communication connection.

20 Claims, 16 Drawing Sheets

(51) Int. Cl.
    *H04W 12/00*     (2009.01)
    *H04W 84/04*     (2009.01)
    *H04B 17/318*     (2015.01)
    *H04W 4/60*     (2018.01)
    *H04W 76/15*     (2018.01)
    *H04W 76/30*     (2018.01)
    *H04W 4/50*     (2018.01)
    *H04W 8/20*     (2009.01)
    *H04W 48/16*     (2009.01)
    *H04W 48/18*     (2009.01)

(52) U.S. Cl.
    CPC ............... *H04L 63/18* (2013.01); *H04W 4/50* (2018.02); *H04W 4/60* (2018.02); *H04W 8/20* (2013.01); *H04W 8/205* (2013.01); *H04W 12/0023* (2019.01); *H04W 12/00405* (2019.01); *H04W 48/16* (2013.01); *H04W 48/18* (2013.01); *H04W 76/15* (2018.02); *H04W 76/30* (2018.02); *H04W 84/042* (2013.01)

(58) Field of Classification Search
    CPC ..... H04W 76/15; H04W 4/60; H04W 84/042; H04W 12/00405; H04W 12/0023; H04W 8/205; H04B 17/318; H04L 63/18; H04L 63/102
    See application file for complete search history.

(56)     References Cited

U.S. PATENT DOCUMENTS

| | | |
|---|---|---|
| 2015/0349825 A1 | 12/2015 | Lee et al. |
| 2016/0020803 A1 | 1/2016 | Cha et al. |
| 2016/0119780 A1 | 4/2016 | Jung et al. |
| 2018/0109676 A1* | 4/2018 | Yeoum .................. H04M 3/387 |
| 2019/0342943 A1* | 11/2019 | Rice ...................... H04W 48/18 |

* cited by examiner

| SPN |
|---|
| [Only] Free Download |
| [Only] Profile Market |
| [Only] Profile Download |
| [Only] SIM Download |

FIG.10A

| RSSI |
|---|
| P 📶 |
| F 📶 |
| ? 📶 |
| ! 📶 |

FIG.10B

| RAT |
|---|
| Free [+]<br>↑↓ |
| Provisioning<br>↑↓ |
| LTE [+]<br>↑↓ |

Now, the free data connection is not available.
Thus, you are not able to use data connect.

Please use the other services such as Wifi for
profile download.

ELECTRONIC DEVICE AND METHOD FOR PROVIDING COMMUNICATION SERVICE BASED ON SUBSCRIBER IDENTITY INFORMATION IN ELECTRONIC DEVICE

CROSS-REFERENCE TO RELATED APPLICATION

This application is based on and claims priority under 35 U.S.C. 119 to Korean Patent Application No. 10-2018-10-0027296, filed on Mar. 8, 2018, in the Korean Intellectual Property Office, the disclosure of which is incorporated by reference herein in its entirety.

TECHNICAL FIELD

The disclosure relates to an electronic device and a method for providing communication service based on subscriber identity information by an electronic device.

BACKGROUND

In a wireless communication system, a user equipment (UE) can access a wireless communication network and can use voice communication or data communication services at a designated location or while on the move. An appropriate authentication process is required in order to provide a communication service for the UE. A Universal Integrated Circuit Card (UICC) may be installed or embedded in the UE and may be used in the authentication process. A USIM application or a subscriber identity (ID) of a mobile network operator, an encryption key, or the like may be remotely installed in the UICC.

An eUICC may be manufactured as a UICC that is pre-installed, for example, is fixed in the form of a chip, in a UE in the process of manufacturing the UE.

Such an eUICC may store subscriber identity information, for example, a profile that is installed to provide communication services. The profile may be installed in the process of manufacturing the eUICC, or may be downloaded by the UE over the air (OTA) and may be installed in the eUICC.

An electronic device may establish a first communication connection using a provisioning profile only when an operational profile is downloaded. To receive a communication service other than downloading the operational profile, the electronic device may need a second communication connection using the operational profile rather than the first communication connection. For example, a user may not be able to process a request to transmit or receive other data during the first communication connection based on the provisioning profile for downloading the operational profile.

Alternatively, while establishing the first communication connection for downloading the operational profile using the provisioning profile, the electronic device may merely indicate that the electronic device is being connected to a network or the name of the connected network but may not explicitly indicate whether first communication being currently connected is communication for downloading the operational profile through the provisioning profile. In this case, the user recognizes only that the electronic device may use the network and may attempt to transmit or receive data for uses other than downloading of the operational profile. However, while downloading the operational profile through the provisioning profile, it is impossible to transmit or receive data for uses other than downloading of the operational profile, and thus the user may feel confused by the display of unclear information.

Alternatively, when there is one provisioning profile, the electronic device may download the operational profile based on the one provisioning profile. However, when there is a plurality of provisioning profiles in the electronic device, there is no way to determine which provisioning profile to use, making it difficult to choose which provisioning profile to use among the plurality of provisioning profiles.

SUMMARY

According to various example embodiments, an electronic device and a method for providing a communication service based on subscriber identity information by an electronic device which enable transmission or reception of data using an operational profile when there is a request for the transmission or reception of the data (e.g., data transmission or reception, notification reception, a link request, or a service request by another application) other than downloading of a profile while using a provisioning profile for downloading the profile may be provided.

According to various example embodiments, an electronic device and a method for providing a communication service based on subscriber identity information by an electronic device which explicitly display the state in which an operational profile is being downloaded through a provisioning profile when performing an operation of downloading the operational profile through the provisioning profile, thereby enabling a user to clearly recognize that the operational profile is being downloaded may be provided.

According to various example embodiments, an electronic device and a method for providing a communication service based on subscriber identity information by an electronic device which are capable of selecting a provisioning profile to use based on information about a currently connected network when there is a plurality of provisioning profiles in the electronic device may be provided.

An electronic device according to various example embodiments may include: a display; communication circuitry; a memory comprising an embedded subscriber identity module configured to store first information associated with a first communication connection configured to download first data comprising first subscriber identity information by accessing at least one communication service providing server; and a processor operatively connected to the display, the communication circuitry, and the memory, wherein the processor is configured to control the electronic device to establish the first communication connection for downloading the first data comprising the first subscriber identity information based on the first information using the communication circuitry, to terminate the first communication connection and to transmit and/or receive the first data comprising the first subscriber identity information by establishing a second communication connection based on second subscriber identity information upon receiving a request to transmit and/or receive data not including the first subscriber identity information during the first communication connection.

A method for providing a communication service based on subscriber identity information by an electronic device according to various example embodiments may include: establishing a first communication connection based on first information associated with the first communication connection configured to download first data comprising first subscriber identity information to a subscriber identity module; and terminating the first communication connection and transmitting and/or receiving requested data by establishing a second communication connection based on a second subscriber identity information upon receiving a request to transmit and/or receive data not including the first subscriber identity information during the first communication connection.

A non-transitory computer readable recording medium according to various example embodiments may store instructions, wherein the instructions, when executed by at least one circuit, enable the at least one circuit to perform at least one operation, the at least one operation including: performing a first communication connection based on first information associated with the first communication connection for downloading first subscriber identity information to a subscriber identity module; and terminating the first communication connection and transmitting and/or receiving requested data by establishing a second communication connection based on a second subscriber identity information upon receiving a request to transmit and/or receive the data not including the first subscriber identity information during the first communication connection.

According to various example embodiments, when there is a request for the transmission and/or reception of data, for example, data transmission and/or reception, notification reception, a link request, and/or a service request by another application, other than downloading of a profile while using a provisioning profile for downloading the profile, an electronic device can transmit and/or receive the data using an operational profile.

According to various example embodiments, when performing an operation of downloading an operational profile through a provisioning profile, an electronic device can explicitly display a state in which the operational profile is being downloaded through the provisioning profile, thereby enabling a user to clearly recognize that the operational profile is being downloaded.

According to various example embodiments, when there is a plurality of provisioning profiles in an electronic device, a criterion for selecting a provisioning profile to use based on information about the network to which the electronic device belongs may be provided, thereby stably managing the provisioning profiles in a manner that is convenient to the user.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 10A is a diagram illustrating an example of displaying an SPN when a first communication connection based on a provisioning profile is being used according to various example embodiments;

FIG. 10B is a diagram illustrating an example of displaying an RSSI when the first communication connection based on the provisioning profile is being used according to various example embodiments;

FIG. 10C is a diagram illustrating an example of displaying an RAT when the first communication connection based on the provisioning profile is being used according to various example embodiments;

FIG. 15 is a diagram illustrating an example in which an electronic device displays a screen when there is no provisioning profile according to various example embodiments.

DETAILED DESCRIPTION

Figure 1:
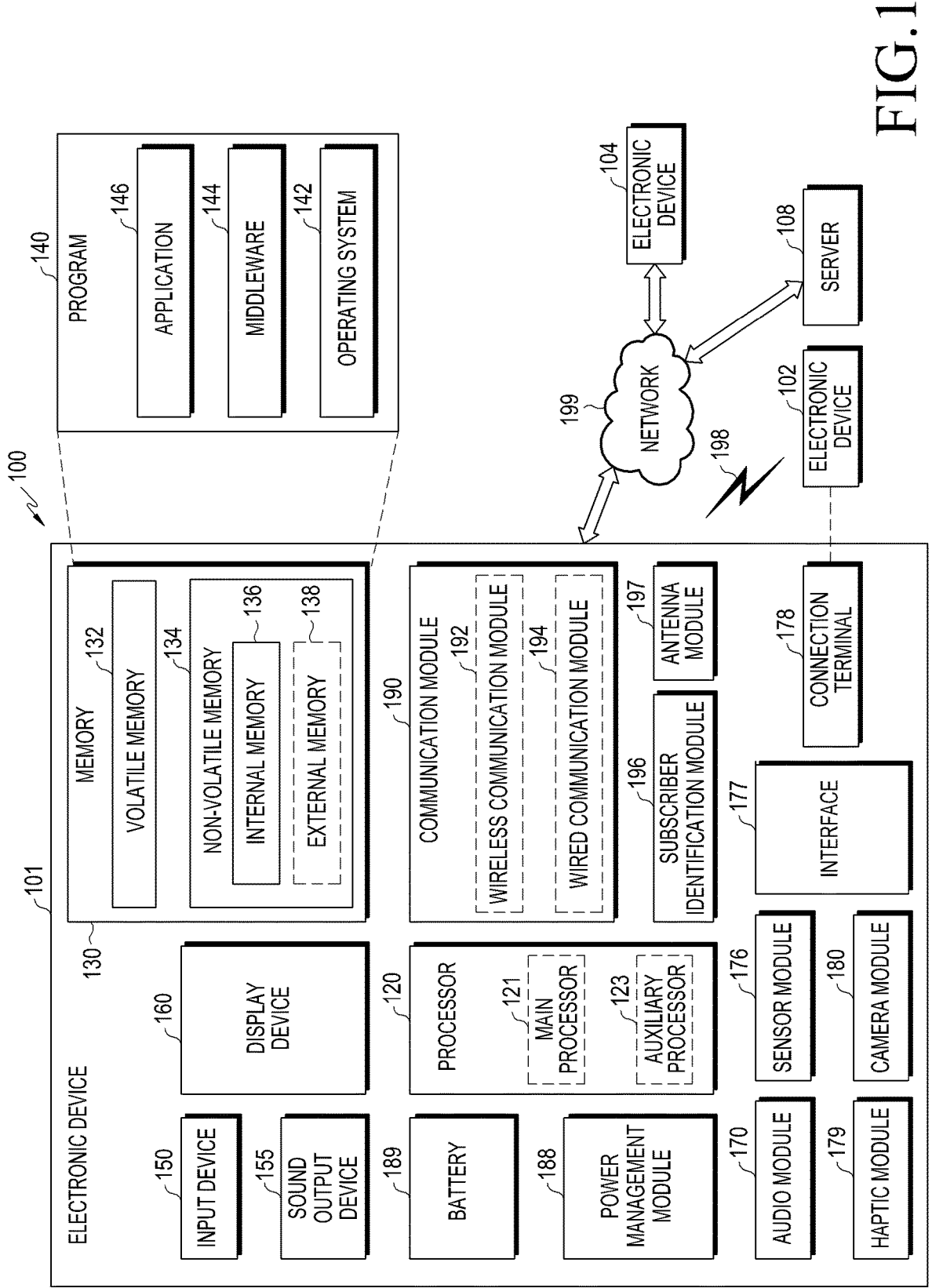
FIG. 1 is a diagram illustrating an electronic device and an external electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command (e.g., an instruction) or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments, without preloading information for receiving at least one communication service, for example, an operational profile, in an electronic device, the electronic device having an embedded Universal Integrated Circuit Card (eUICC) can remotely download an operational profile through a first communication connection based on a provisioning profile, and can receive a communication service provided by a mobile network operator based on the operational profile.

According to various example embodiments, a Universal Integrated Circuit Card (UICC) may functionally include equivalents to an embedded UICC (eUICC) that can remotely download and install a profile for using a communication service and may physically include various types of UICCs that are detachably installed in a UE or are embedded in a UE. Also, the eUICC mentioned in the following example embodiments may be a designation used for the convenience of description and may be replaced with various types of UICCs.

According to various example embodiments, the eUICC may refer, for example, to a smart card that is inserted into a UE for use and may store information for receiving at least one communication service. The information for receiving at least one communication service may include, for example, and without limitation, an International Mobile Station Identity (IMSI), network access authentication information of a subscriber, a telephone directory of a subscriber, personal information of a subscriber (SMS), information for authenticating a subscriber and generating a traffic security key to enable the secure use of wireless communication when accessing a wireless communication network, or the like, such as, for example, and without limitation, a Global System for Mobile Information (GSM), Wideband Code Division Multiple Access (WCDMA), Long-Term Evolution (LTE), or the like. For example, the IMSI may include, for example and without limitation, a Mobile Country Code (MCC), a Mobile Network Code (MNC), a Mobile Subscription Identification Number (MSIN), or the like. A communication application, such as, for example, and without limitation, a Subscriber Identification Module (SIM), a Universal SIM (USIM), an IP Multimedia SIM (ISIM), a Code Division Multiple Access (CDMA) SIM (CSIM), or the like, may be installed in the eUICC depending on the type of a wireless communication network to which a subscriber connects, or the eUICC may provide a high-level security function for installing various applications, such as, for example, and without limitation, an electronic wallet, a ticketing application, an electronic passport, or the like. As used herein, the term "UICC" may be used interchangeably with the term "SIM", and the term "eUICC" may be used interchangeably with the term "eSIM".

For instance, it is assumed that the eUICC is an example of a UICC that is a chip-type security module embedded in a UE. However, example embodiments disclosed herein may be equally applied to a UICC that is manufactured to be detachable in a conventional UICC form and has functions and electrical and software properties equivalent to those of an eUICC as long as the UICC is not functionally different.

According to various example embodiments, the eUICC may store one or a plurality of profiles. A profile may refer, for example, to a packaged software form of at least one of an application, a file system, and an authentication key value stored in the eUICC. For example, the profile may include a provisioning profile and an operational profile. The operational profile may refer, for example, to a packaged software form of an IMSI and subscription information about a mobile network operator to which the user of the electronic device subscribes. For example, the operational profile may include an IMSI, and the IMSI may include an MCC, an MNC, and an MSIN. In addition to the IMSI, the operational profile may further include network access authentication information of a subscriber, a telephone directory of a subscriber, personal information of a subscriber (SMS), the name of a mobile network operator to which a subscriber subscribes, an available service, an available data amount, a charge, a service provision speed, information for authenticating a subscriber and generating a traffic security key to enable the secure use of wireless communication when accessing a wireless communication network, such as a GSM, WCDMA, or LTE, or the like, but is not limited thereto. The provisioning profile may refer, for example, to a profile that includes first information for downloading at least one operational profile (e.g., a first operational profile) from the electronic device.

Figure 2:
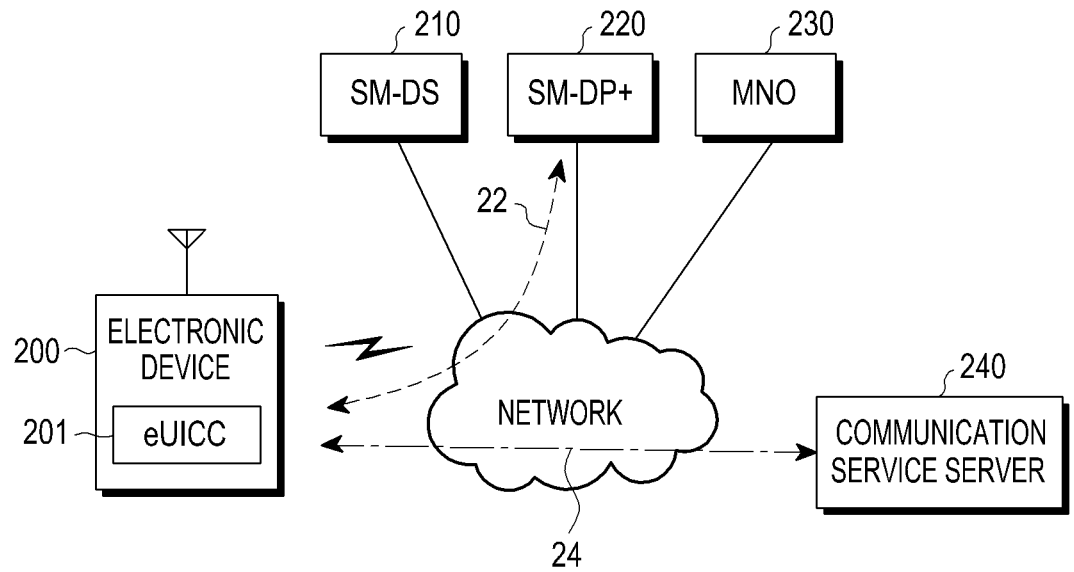
FIG. 2 is a diagram illustrating an example system for providing a profile-based communication connection to an electronic device according to various example embodiments.

FIG. 2 is a diagram illustrating an example system for providing a profile-based communication connection to an electronic device according to various example embodiments.

Referring to FIG. 2, the system according to various example embodiments may include an electronic device 200, an SM-DS server 210, an SM-DP+ server 220, an MNO server 230, and a communication service server 240.

According to various example embodiments, the electronic device 200 (e.g., the electronic device 100 in FIG. 1) may include an eUICC 201 (e.g., the subscriber identity module 196 in FIG. 1).

According to various example embodiments, the eUICC 201 may be inserted into the electronic device 200, may be integrated within the electronic device 200, or may be configured such that the electronic device 200 can access the eUICC 201. According to various example embodiments, the eUICC 201 may be configured to enable the electronic device 200 to perform authentication with a server of a mobile network operator (MNO) using information (e.g., a profile including a Universal Subscriber Identity Module (USIM)) in the eUICC 201. According to an example embodiment, the eUICC 201 may, for example, be referred to as a Subscriber Identity Module (MI) card in GSM, and as a USIM card in LTE or WDCMA, or may be designated by various terms depending on the communication mode. For example, when a user of the electronic device 200 subscribes to a wireless communication service provided by the MNO, the electronic device 200 may implement an appropriate authentication process with the server of the MNO, which stores an IMSI value and a value K, using the information in the eUICC 201, for example, the IMSI value and the value K, which may refer, for example, to an encryption key for authentication, thereby using a wireless communication service. For example, the appropriate authentication process may be an Authentication and Key Agreement (AKA) authentication process, but other authentication methods may be available and the disclosure is not limited thereto.

According to various example embodiments, the eUICC 201 may be manufactured as a card dedicated for a particular MNO at the request of the particular MNO, and authentication information (e.g., a USIM application and a subscriber identification ID (e.g., IMSI)) and an encryption key (e.g., a known value K or Ki), which are for access to a network of the MNO, may be preloaded on the eUICC 201. An application (or information) in the eUICC 201 may be installed, modified, deleted, and/or updated using an Over-The-Air (OTA) technique or the like if necessary.

According to various example embodiments, the eUICC 201 may download and/or store information for providing a communication service in the form of a profile. According to an example embodiment, the profile may be installed or stored in the process of manufacturing the eUICC 201, and/or may be downloaded by a UE in an OTA manner and may be installed and/or stored in the eUICC 201. For example, the profile may include a provisioning profile and an operational profile. For example, the operational profile may refer, for example, to a profile that includes an IMSI of the user of the electronic device, and the provisioning profile may include information (hereinafter, also referred to as "first information") for the electronic device to download the IMSI or the profile (hereinafter, also referred to as a "first operational profile") including the IMSI (hereinafter, also referred to as a "first IMSI"). The electronic device may download the first operational profile based on the first information on the provisioning profile in the eUICC 201.

According to various example embodiments, the electronic device 200 may be provided with a communication service using an IMSI (hereinafter, also referred to as a "second IMSI") of an operational profile (hereinafter, also referred to as a "second operational profile") installed and/or stored in the eUICC 201. For example, a profile including an IMSI may be a SIM profile.

According to an example embodiment, the operational profile may further include, in addition to the IMSI, network access authentication information of a subscriber, a telephone directory of a subscriber, personal information of a subscriber (SMS), the name of a subscribed mobile network operator, an available service, an available data amount, a charge, a service provision speed, information for authenticating a subscriber and generating a traffic security key, or the like, to enable the secure use of wireless communication when accessing a wireless communication network, such as a GSM, WCDMA, LTE network, or the like, but the disclosure is not limited thereto.

According to various example embodiments, the first information for downloading data (e.g., first data or the first operational profile) including the first IMSI may include communication session information for a first communication connection designated for downloading the first operational profile. For example, the communication session information may include access information about a Subscription Manager Discovery Service (SM-DS) server 210 for downloading the first operational profile or MNO network information available for access to the SM-DS server 210.

According to various example embodiments, the SM-DS server 210 may provide the electronic device 200 with an address of a Subscription Manager Data Preparation Plus (SM-DP+) server 220 for downloading the first operational profile based on the provisioning profile.

According to various example embodiments, the SM-DP+ server 220 may refer, for example, and without limitation to a profile provision server, an off-card entity of a profile domain, a profile encryption server, a profile generation server, a profile provisioner, a profile provider, or the like. The SM-DP+ server 220 may establish a first communication connection 22 with the electronic device 200 over a wireless communication network based on a first communication connection request based on the provisioning profile from the electronic device 200 and may provide the first operational profile to the electronic device 200 via the first communication connection 22. According to various example embodiments, the wireless communication network may be a particular node of the wireless communication network. For example, the wireless communication network may be, for example, and without limitation, a base station, a subscriber information management node, a mobility management node of the wireless communication network, or the like. According to an example embodiment, the wireless communication network may include a Home Location Register (HLR) and/or Authentication Center (AuC) server that the electronic device 200 accesses to perform a user authentication function and may be connected to a communication service server 240 that the electronic device 200 accesses after authentication in order to be provided with a communication service, such as voice communication or data communication.

According to various example embodiments, an MNO server 230 may refer, for example, to a server associated with a mobile network operator. According to various example embodiments, the MNO server 230 may request the SM-DP+ server 220 to prepare at least one profile (or profile package) (e.g., the first operational profile) associated with at least one IMSI (e.g., the first IMSI) and may forward information associated with the first operational profile to the SM-DP+ server 220. According to an example embodiment, the MNO server 230 may forward a signal for updating and managing the first operational profile to the SM-DP+ server 220. The MNO server 230 may allow a second communication connection 24 between the electronic device 200 and the communication service server 240 through the second operational profile installed in the eUICC 201 of the electronic device 200.

According to various example embodiments, the communication service server 240 may refer, for example, to a server that provides a communication service. According to various example embodiments, the communication service may be a service associated with the transmission and/or reception of data over the wireless communication network. According to an example embodiment, the communication service may include a service associated with the transmission and/or reception of other profiles (or data) including no IMSI other than downloading of the operational profile (e.g., the first operational profile including the first IMSI). For example, the communication service server 240 may include a service server associated with the transmission and reception of various types of data, such as, for example, and without limitation, a server associated with each of various applications, a push server, a search server, a market server, or the like, and the communication service by the communication service server 240 may include various services, such as, for example, and without limitation, data transmission and reception, notification reception, push reception, link reception and connection, a service request by an application, or the like.

The electronic device 200 may establish the second communication connection 24 with the communication service server 240 based on the second operational profile upon request for a service associated with the transmission or reception of a profile (or data) including no IMSI.

The SM-DS server 210, the SM-DP+ server 220, the MNO server 230, and the communication service server 240 are provided merely as illustrative examples of servers performing respective functions thereof according to various example embodiments, and may be designated by different terms. The SM-DS server 210, the SM-DP+ server 220, the MNO server 230, and/or the communication service server 240 may each include one or a plurality of servers. Some or all of the SM-DS server 210, the SM-DP+ server 220, the MNO server 230, and/or the communication service server 240 may be configured as a single integrated server.

According to various example embodiments, an electronic device (e.g., the electronic device 100 in FIG. 1 or the electronic device 200 in FIG. 2) may include: a display (e.g., the display device 160 in FIG. 1); a communication module (e.g., communication circuitry) (e.g., the communication module 190 in FIG. 1); a memory (e.g., the memory 130 in FIG. 1 or the memory 320 in FIG. 3) configured to include an embedded subscriber identity module (e.g., the subscriber identity module 196 in FIG. 1 or the eUICC 201 in FIG. 2) that stores first information associated with a first communication connection for downloading first data including first subscriber identity information by accessing at least one communication service-providing server; and a processor (e.g., the processor 120 in FIG. 1) configured to be electrically (or operatively) connected to the display, the communication module, and the memory, wherein the processor may be configured to control the electronic device to perform the first communication connection for downloading the first data including the first subscriber identity information based on the first information using the communication module, to terminate the first communication connection and to transmit and/or receive the data by establishing a second communication connection based on a second subscriber identity information upon receiving a request to transmit and/or receive data not including the first subscriber identity information during the first communication connection.

According to various example embodiments, the first information may include a provisioning profile, and the first data including the first subscriber identity information may include a first operational profile.

According to various example embodiments, the processor may be configured to control the display to display information indicating that a second operational profile corresponding to the second subscriber identity information does not exist on the display when the second subscriber identity information does not exist in the subscriber identity module upon receiving the request to transmit and/or receive the data during the first communication connection.

According to various example embodiments, the processor may be further configured to control the display to display a purchase screen associated with the second operational profile when the second operational profile does not exist.

According to various example embodiments, the processor may be configured to control the electronic device to establish a second communication session based on a previously used second operational profile.

According to various example embodiments, the processor may be configured to control the electronic device to establish a second communication session based on the second operational profile that is selected by a user.

According to various example embodiments, the processor may be configured to control the display to display at least one indicator indicating the first communication connection based on the provisioning profile on the display.

According to various example embodiments, the at least one indicator may include at least one type among: a Service Provider Name (SPN), a Radio Access Technology (RAT), and a Received Signal Strength Indicator (RSSI).

According to various example embodiments, the processor may be configured to control the electronic device to select the provisioning profile associated with a network with which a connection is being established via the communication module.

According to various example embodiments, the processor may be configured to control the electronic device to select the provisioning profile associated with the network with which the connection is being established via the communication module based on at least one of a PLMN identifier, an MCC, and regional information of the network with which the connection is being established.

Figure 3:
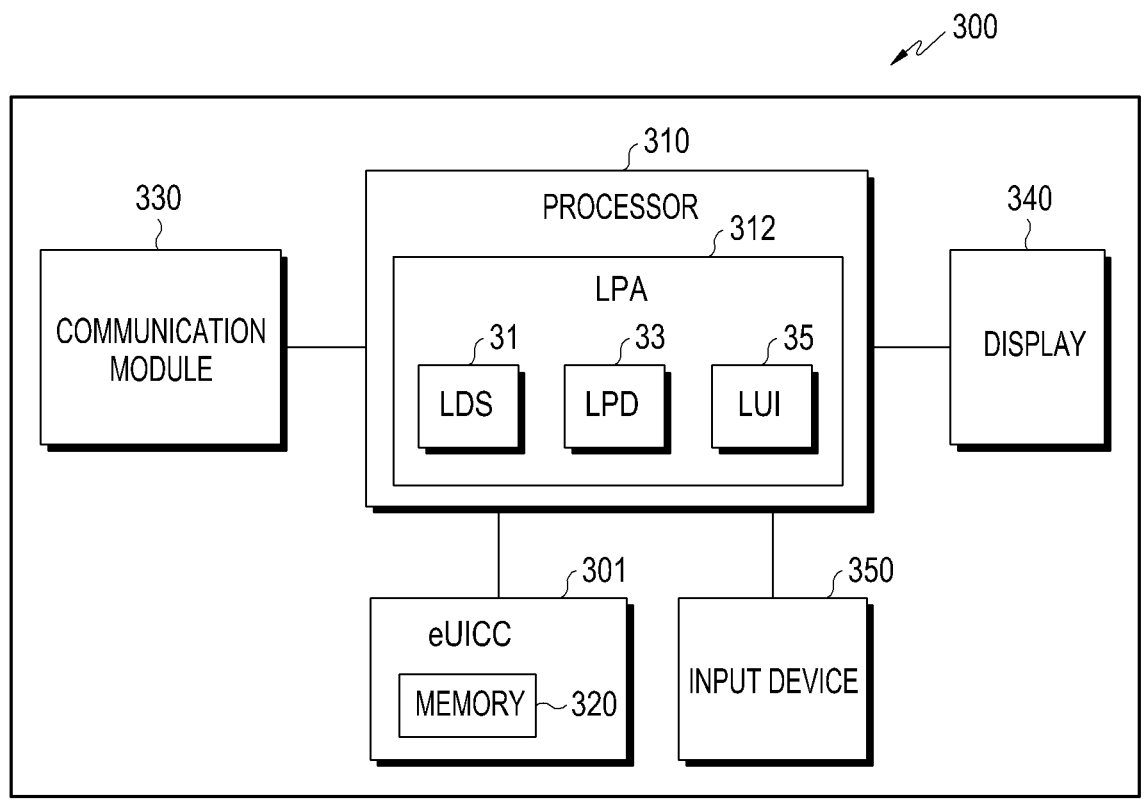
FIG. 3 is a block diagram illustrating an example configuration of an electronic device according to various example embodiments.

FIG. 3 is a block diagram illustrating an example configuration of an electronic device according to various example embodiments.

Referring to FIG. 3, the electronic device 300 (e.g., the electronic device 100 in FIG. 1 or the electronic device 200 in FIG. 2) according to various example embodiments may include a processor (e.g., including processing circuitry) 310, an eUICC 301 including a memory 320, a communication module (e.g., including communication circuitry) 330, a display 340, and an input device (e.g., including input circuitry) 350.

According to various example embodiments, the processor 310 (e.g., the processor 120 in FIG. 1) may include one or a plurality of processors (e.g., the main processor 121 and the coprocessor 123 in FIG. 1 or an application processor and a communication processor) and may include a Local Profile Assistant (LPA) 312 according to an example embodiment. According to various example embodiments, when the processor 310 includes a plurality of processors, a portion of the LPA 312 may be included in some of the plurality of processors, and another portion of the LPA 312 may be included in others of the plurality of processors.

According to various example embodiments, the LPA 312 may include various processing circuitry and/or executable program elements and perform communication with a server to support operations of downloading, installing, and managing a profile of the eUICC 301 or may perform a function of providing a user interface necessary for the operations of downloading, installing, and managing the profile. The LPA 312 may be a functional module that provides Local Discovery Services (LDS) 31, Local Profile Download (LPD) 33, and Local User Interface (LUI) 35 functions in the electronic device 300, each of which may include various processing circuitry and/or executable program elements.

According to various example embodiments, the LDS 31 may function to receive an address of an SM-DP+ server 220 for downloading an operational profile based on communication with an SM-DS server 210 and a provisioning profile from the SM-DP server 210.

According to various example embodiments, the LPD 33 may establish a first communication connection 22 with the SM-DP+ server 220 via a wireless communication network based on the address of the SM-DP+ server 220 and may function to receive a first operational profile from the SM-DP+ server 220 via the first communication connection 22. According to various example embodiments, the LPD 33 may support an operation of downloading, enabling, disabling, and/or deleting a profile or an operation of downloading a policy rule, which is initiated by the network, and/or may support an operation of enabling, disabling, and/or deleting a profile or an operation of resetting an eUICC by the electronic device.

According to various example embodiments, the LUI 35 may function to provide various user interfaces when the operational profile is downloaded. According to an example embodiment, the LUI 35 may support data exchange between the LDS 31, the LPD 33, and the user, and may include a UI for forwarding a user's input to the LDS 31 and/or the LPD 33.

According to an example embodiment, the processor 310 may perform a communication service using the LPA 312 based on information stored in the eUICC 301. For example, the processor 310 may establish a first communication connection with the SM-DP+ 220 through the communication module 330 using the LPA 312 based on the provisioning profile stored in the eUICC 301 in order to download a profile (e.g., the first operational profile) including a first IMSI. The processor 310 may terminate the first communication connection and may establish a second communication connection based on a second IMSI to transmit and/or receive the profile or data including no IMSI, upon receiving a request to transmit or receive a profile or data including no IMSI during the first communication connection using the LPA 312.

According to various example embodiments, the eUICC 301 (e.g., the subscriber identity module 196 in FIG. 1 or the eUICC 201 in FIG. 2) may include one or a plurality of profiles as information for receiving a communication service. A profile may refer, for example, to a packaged software form of at least one of an application, a file system, and an authentication key value stored in the eUICC 301. For example, the profile may include a provisioning profile and an operational profile. The operational profile may include an IMSI, and may further include, in addition to the IMSI, network access authentication information of a subscriber, a telephone directory of a subscriber, personal information of a subscriber (SMS), the name of a subscribed mobile network operator, an available service, an available data amount, a charge, a service provision speed, information for authenticating a subscriber and generating a traffic security key to enable the secure use of wireless communication when accessing a wireless communication network, such as a GSM, WCDMA, or LTE, or the like, but is not limited thereto. According to an example embodiment, the operational profile may include a SIM profile. For example, the SIM profile may include a SIM file system (a master file (MF), a dedicated file (DF), an elementary file (EF)), or the like, and an IMSI value may be stored in the elementary file.

According to various example embodiments, the provisioning profile may be a profile that includes first information for the electronic device to download a first operational profile. For example, the first information may include communication session information for a first communication connection designated for downloading the first operational profile. For example, the communication session information may include access information about an SM-DS server (e.g., the SM-DS server 210 in FIG. 2) for downloading the first operational profile and MNO network information available for access to the SM-DS server.

According to various example embodiments, the communication module 330 (e.g., the communication module 192 in FIG. 1) may include various communication circuitry and perform first communication based on the provisioning profile or second communication based on a second operational profile.

The display 340 (e.g., the display 160 in FIG. 1) may display at least one screen associated with the first communication based on the provisioning profile or the second communication based on the second operational profile.

The input device 350 (e.g., the input device 150 in FIG. 1) may include various input circuitry and receive input by a user.

Although the LPA 312 has been described as a component included in the processor 310 according to an example embodiment, at least some functions of the LPA 312 may be performed by the processor 310, or a separate LPA 312 may operate in conjunction with the processor 310. For example, the LPA 312 may be included in a program (e.g., the program 140 in FIG. 1), or may be loaded onto and executed by the processor 310. When the LPA 312 is loaded onto and executed by the processor 310, this operation may be understood as an operation of the processor 310. According to various example embodiments, the functional modules (e.g., the LDS 31, the LPD 33, or the LUI 35) included in the LPA 312 are shown as being separated and may be represented by other functional modules, without being limited to the embodiment.

FIG. 4A is a diagram illustrating an example method of implementing an LPA function according to various example embodiments, FIG. 4B is a diagram illustrating an example method of implementing an LPA function according to various example embodiments, and FIG. 4C is a diagram illustrating an example method of implementing an LPA function according to various example embodiments.

Referring to FIGS. 4A, 4B and 4C, a processor (e.g., the processor 120 in FIG. 1 or the processor 310 in FIG. 3) (e.g., including processing circuitry) 410 of an electronic device (e.g., the electronic device 100 in FIG. 1, the electronic device 200 in FIG. 2, or the electronic device 300 in FIG. 3) may include one or a plurality of processors (e.g., the main processor 121 and the coprocessor 123 in FIG. 1), and may include an Application Processor (AP) (e.g., including processing circuitry) 412 and a Communication Processor (CP) (e.g., including processing circuitry) 414 according to an example embodiment. According to another example embodiment, the AP 412 may be included in the processor 410, and the CP 414 may be included in a communication module (e.g., the communication module 190 in FIG. 1 or the communication module 330 in FIG. 3).

According to various example embodiments, the function of an LPA 411 (e.g., the LPA 312 in FIG. 3) may be included in one of the AP 412 and the CP 414. A portion of the function of the LPA 411 may be included in the AP 412, and another portion of the function of the LPA 411 may be included in the CP 414.

Referring to FIG. 4A, the function of the LPA 411 may be performed by the AP 412. When the function of the LPA 411 is performed by the AP 412, all of an LDS 41, an LPD 43, and an LUI 45 of the LPA 411 may be performed by the AP 401. In this example, the AP 401 may interface with an SM-DS (e.g., the SM-DS 210 in FIG. 2), an SM-DP+(e.g. the SM-DP+ in FIG. 2), and a user to manage a profile in an eUICC 401. For example, the LPA 411 may support operations of downloading, enabling, disabling, and deleting each of a provisioning profile and an operational profile or an operation of downloading a policy rule.

Referring to FIG. 4B, the function of the LPA 411 may be performed by the CP 414. When the function of the LPA 411 is performed by the CP 414, all of the LDS 41, the LPD 43, and the LUI 45 of the LPA 411 may be performed by the CP 414. In this example, the CP 414 may interface with the SM-DS (e.g., the SM-DS 210 in FIG. 2), the SM-DP+(e.g. the SM-DP+ in FIG. 2), and the user to manage the profile in the eUICC 401.

Referring to FIG. 4C, a portion of the function of the LPA 411 may be performed by the AP 412, and the remainder may be performed by the CP 414. For example, and without limitation, the LDS 41 and the LPD 43 of the LPA 411 may be performed by the CP 414, and the LUI 45 may be performed by the AP 412. In this example, the CP 414 may interface with the SM-DS (e.g., the SM-DS 210 in FIG. 2) and the SM-DP+(e.g. the SM-DP+ in FIG. 2), and the AP 412 may interface with the user, thereby managing the profile in the eUICC 401.

For example, each of the LDS 41, the LPD 43, or the LUI 45 of the LPA 411 may be included in a program (e.g., the program 140 in FIG. 1) and may be loaded onto and executed by the AP 412 or the CP 414. When each of the LDS 41, the LPD 43, or the LUI 45 is loaded onto and executed by the AP 412 or the CP 414, this operation may be understood as an operation of the AP 412 or the CP 414. According to various example embodiments, the functional modules (e.g., the LDS 41, the LPD 43, or the LUI 45) included in the LPA 411 are shown as being separated and may be represented by other functional modules, without being limited to the embodiment.

Figure 5:
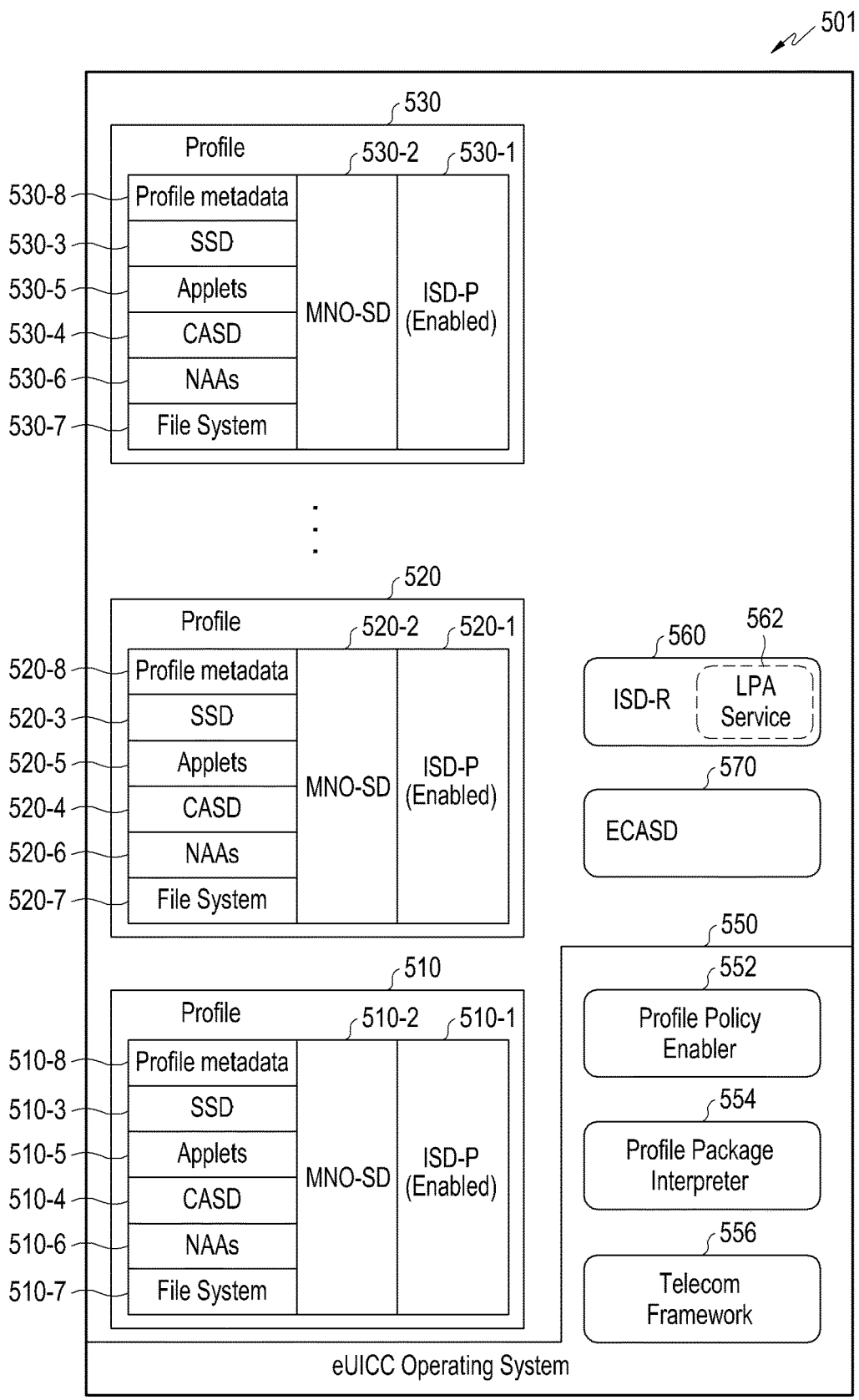
FIG. 5 is a diagram illustrating an example internal structure of an eUICC according to various example embodiments.

FIG. 5 is a diagram illustrating an example internal structure of an eUICC according to various example embodiments.

Referring to FIG. 5, the eUICC 501 (e.g., the eUICC 201 in FIG. 2, the eUICC 301 in FIG. 3, or the eUICC 401 in FIG. 4) according to an example embodiment may be in a card or chip form, and at least one profile 510, 520, and 530 in a software format may be installed therein. According to various example embodiments, each of the at least one profile 510, 520, and 530 may be a provisioning profile or an operational profile. The at least one profile 510, 520, and 530 may operate on an eUICC Operating System (OS) 550. Each of the at least one profile 510, 520, and 530 may be enabled or disabled by a processor or an LPA (e.g., the LPA 312 in FIG. 3 or the LPA 411 in FIG. 4)). In FIG. 5, according to one example embodiment, one profile 510 may be in an enabled state, and the remaining profiles 520 and 530 may be in a disabled state.

According to various example embodiments, the eUICC OS 550 of the eUICC 501 may include a profile policy enabler 552, a profile package interpreter 554, and a telecom framework 556, each of which may include various processing circuitry and/or executable program elements. According to an example embodiment, the profile policy enabler 552 may manage a policy rule for each of the at least one profile 510, 520, and 530. According to an example embodiment, the profile package interpreter 554 may unpackage a profile package, received from the SM-DP+ 220, into a form that can be installed in the eUICC 501. According to an example embodiment, the telecom framework 556 may perform a function associated with communication for applications in the eUICC 501. According to various example embodiments, the eUICC 501 may include an Issuer Security Domain Root (ISD-R) 560 and an eUICC Controlling Authority Security Domain (ECASD) 570. According to an example embodiment, the ISD-R 560 may manage the at least one profile 510, 520, and 530 installed in the eUICC 501. For example, the ISD-R 560 may include an LPA service 562, and the LPA service 562 may manage the at least one profile 510, 520, and 530 installed in the eUICC 501 through an interface with a processor or an LPA (e.g., the LPA 312 in FIG. 3 or the LPA 411 in FIG. 4). According to an example embodiment, the ECASD 570 may perform security processing of the at least one profile 510, 520, and 530 installed in the eUICC 501.

According to various example embodiments, each of the at least one profile 510, 520, and 530 may include an ISD-P 510-1, 520-1, or 530-1, an MNO-SD 510-2, 520-2, or 520-3, a Supplementary Security Domain (SSD) 510-3, 520-3 or 530-3, a Controlling Authority Security Domain (CASD) 510-4, 520-4, or 530-4, applets 510-5, 520-5, or 530-5, Network Access Applications (NAAs) 510-6, 520-6, or 530-6, a file system 510-7, 520-7, or 530-7, and/or profile metadata 510-8, 520-8, or 530-8.

According to an example embodiment, the ISD-P 510-1, 520-1, or 530-1 may include information for decoding and interpreting a profile package, and may be used to unpackage and install a profile package, received from the DHK SM-DP+ 220, in cooperation with the profile package interpreter 554.

According to an example embodiment, the MNO-SD 510-2, 520-2, or 530-2 may include an Over-The-Air (OTA) key of an MNO, and may include information for providing a secure OTA channel for communication with the MNO.

According to an example embodiment, the SSD 510-3, 520-3, or 530-3 and the CASD 510-4, 520-4, or 530-4 may include information for performing security processing of the profile.

According to an example embodiment, the Applets 510-5, 520-5, or 530-5 may include various pieces of application information associated with a user of the profile.

According to an example embodiment, the NAAs 510-6, 520-6, or 530-6 may include application information that enables the profile to access a network.

According to an example embodiment, the file system 510-7, 520-7, or 530-7 may include a file system associated with each piece of information of the profile.

According to an example embodiment, the profile metadata 510-8, 520-8, or 530-8 may also be referred to as a profile record and may include metadata information about the profile in a text form. The metadata information may include, for example, and without limitation, an Integrated Circuit Card ID (ICCID) of the profile, a profile name, the name of a profile-providing MNO, a profile nickname of a user, an icon, a profile class, notification configuration information, profile owner information, a profile policy rule, or the like.

According to various example embodiments, the ICCID of the profile may indicate the unique identifier of each profile as a profile identifier. The profile name may include the name of each profile. The name of the profile-providing MNO may include the name of the MNO providing the profile. The profile nickname of the user may include a user-specified profile nickname. The icon may include an icon corresponding to the profile. The profile class may include information indicating whether the type of the profile is a provisioning profile or an operational profile. The notification configuration information may include an address of a server (e.g., an SM-DP+ server) to receive a notification. The profile owner information may include a Mobile Country Code (MCC), a Mobile Network Code (MNC), and a Group Identifier (GID) 1 or 2 associated with a profile owner. For example, the MCC may be a code for identifying a country, and the MNC may be a code for identifying an MNO. GID 1 or 2 may be regional code information for identifying the group or the region to which the profile belongs. The regional information may include a group including a plurality of countries. The profile policy rule may include policy rule information for managing the profile.

Figure 4:
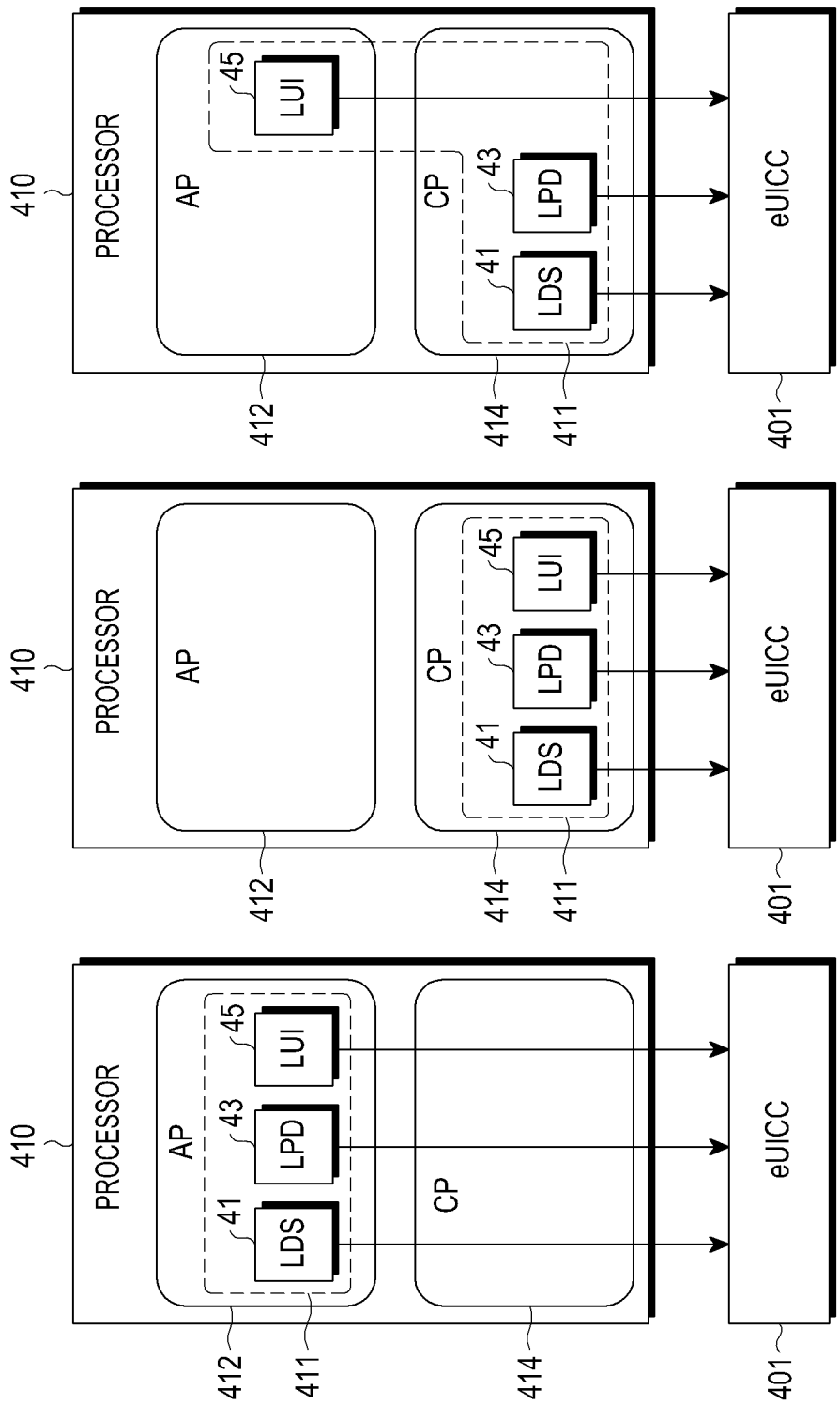
FIG. 4A is a diagram illustrating an example method of implementing an LPA function according to various example embodiments.
FIG. 4B is a diagram illustrating an example method of implementing an LPA function according to various example embodiments.
FIG. 4C is a diagram illustrating an example method of implementing an LPA function according to various example embodiments.

According to various example embodiments, an electronic device (e.g., the electronic device 100 in FIG. 1, the electronic device 200 in FIG. 2, the electronic device 300 in FIG. 3, or the electronic device 400 in FIG. 4) may identify whether a profile is a provisioning profile or an operational profile using profile class information of the profile metadata 510-8, 520-8, or 530-8 included in each of the at least one profile 510, 520, and 530 included in the eUICC 501, and may enable or disable the provisioning profile or the operational profile via the LPA (the LPA 312 in FIG. 3 or the LPA 411 in FIG. 4).

Figure 6:
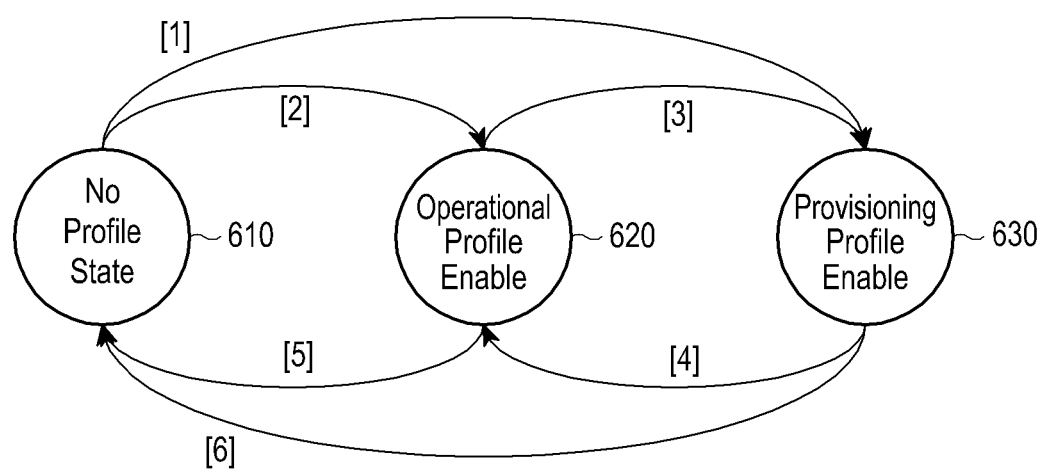
FIG. 6 is a state diagram illustrating a no-profile state, an operational-profile-enabled state, and a provisioning-profile-enabled state according to various example embodiments.

FIG. 6 is a state diagram illustrating a no-profile state, an operational-profile-enabled state, and a provisioning-profile-enabled state according to various example embodiments.

Referring to FIG. 6, the no-profile state 610 may refer, for example, to a state in which both an operational profile and a provisioning profile are disabled or no profile is installed. In the no-profile state 610, a default file system may operate.

The operational-profile-enabled state 620 may refer, for example, to a state in which only the operational profile is enabled. The provisioning-profile-enabled state 630 may be a state in which only the provisioning profile is enabled.

In the no-profile state 610, an electronic device (e.g., the electronic device 100 in FIG. 1, the electronic device 200 in FIG. 2, the electronic device 300 in FIG. 3, or the electronic device 400 in FIG. 4) may switch to the provisioning-profile-enabled state 630 as in [1] in order to download a profile (e.g., a first operational profile), and may switch to the operational-profile-enabled state 620 as in [2] in order to perform data transmission and reception instead of profile downloading. According to an example embodiment, the data transmission and reception other than profile downloading may be the transmission or reception of data associated with a communication service via a wireless communication network. According to an example embodiment, the communication service may include a service associated with the transmission or reception of other profiles (or data) including no first IMSI other than downloading of the operational profile (e.g., the first operational profile including the first IMSI). For example, the communication service may include various services, such as, for example, and without limitation, data transmission and reception, notification reception, push reception, link reception and connection, a service request by an application, or the like, by a service server (e.g., the communication service server 240 in FIG. 2) associated with the transmission and reception of various types of data, such as a server associated with each of various applications, a push server, a search server, or a market server.

In the operational-profile-enabled state 620, the electronic device (e.g., the electronic device 100 in FIG. 1, the electronic device 200 in FIG. 2, the electronic device 300 in FIG. 3, or the electronic device 400 in FIG. 4) may switch to the provisioning-profile-enabled state 630 as in [3] in order to download data (e.g., the first operational profile) including the first IMSI. According to one example embodiment, in the operational-profile-enabled state 620, the electronic device (e.g., the electronic device 100 in FIG. 1, the electronic device 200 in FIG. 2, the electronic device 300 in FIG. 3, or the electronic device 400 in FIG. 4) may download a new profile (e.g., the first operational profile) in the operational profile (e.g., second operational profile)-enabled state 620 without switching the state in consideration of policies or user settings. When there is a request from a user to disable the operational profile (e.g., the second operational profile), the electronic device may switch to the provisioning-profile-enabled state 630 as in [3] or may switch to the no-profile state 610 as in [5].

In the provisioning-profile-enabled state 630, the electronic device (e.g., the electronic device 100 in FIG. 1, the electronic device 200 in FIG. 2, the electronic device 300 in FIG. 3, or the electronic device 400 in FIG. 4) may switch to the operational profile (e.g., second operational profile)-enabled state 620 as in [4] in order to perform the transmission or reception of user data other than profile downloading, and may switch to the no-profile state 610 as in [6] if there is a request to terminate profile downloading from the user (for example, in the absence of the operational profile in an eUICC).

According to various example embodiments, a method for providing a communication service based on subscriber identity information by an electronic device may include: performing a first communication connection based on first information associated with the first communication connection for downloading first data including first subscriber identity information to a subscriber identity module; and terminating the first communication connection and transmitting and/or receiving requested data by establishing a second communication connection based on a second subscriber identity information, upon receiving a request to transmit and/or receive the data not including the first subscriber identity information during the first communication connection.

According to various example embodiments, the first information may include a provisioning profile, and the first data including the first subscriber identity information may include a first operational profile.

According to various example embodiments, the method may further include displaying that a second operational profile corresponding to the second subscriber identity information does not exist on a display when the second subscriber identity information does not exist upon receiving the request to transmit or receive the data during the first communication connection.

According to various example embodiments, the method may further include displaying a purchase screen associated with the second operational profile when the second operational profile does not exist.

According to various example embodiments, a second communication session may be performed based on the previously used second operational profile when the previously used second operational profile exists in the subscriber identity module.

According to various example embodiments, a second communication session may be performed based on the second operational profile that is selected by a user when a plurality of operational profiles exists in the subscriber identity module.

According to various example embodiments, the method may further include displaying at least one indicator indicating that the first communication connection based on the provisioning profile is being used on the display.

According to various example embodiments, the at least one indicator may include at least one type among: a Service Provider Name (SPN), a Radio Access Technology (RAT), and a Received Signal Strength Indicator (RSSI).

According to various example embodiments, the method may further include selecting the provisioning profile based on at least one of: a PLMN identifier, an MCC, and regional information of a network with which a connection is being established via the communication module.

Figure 7:
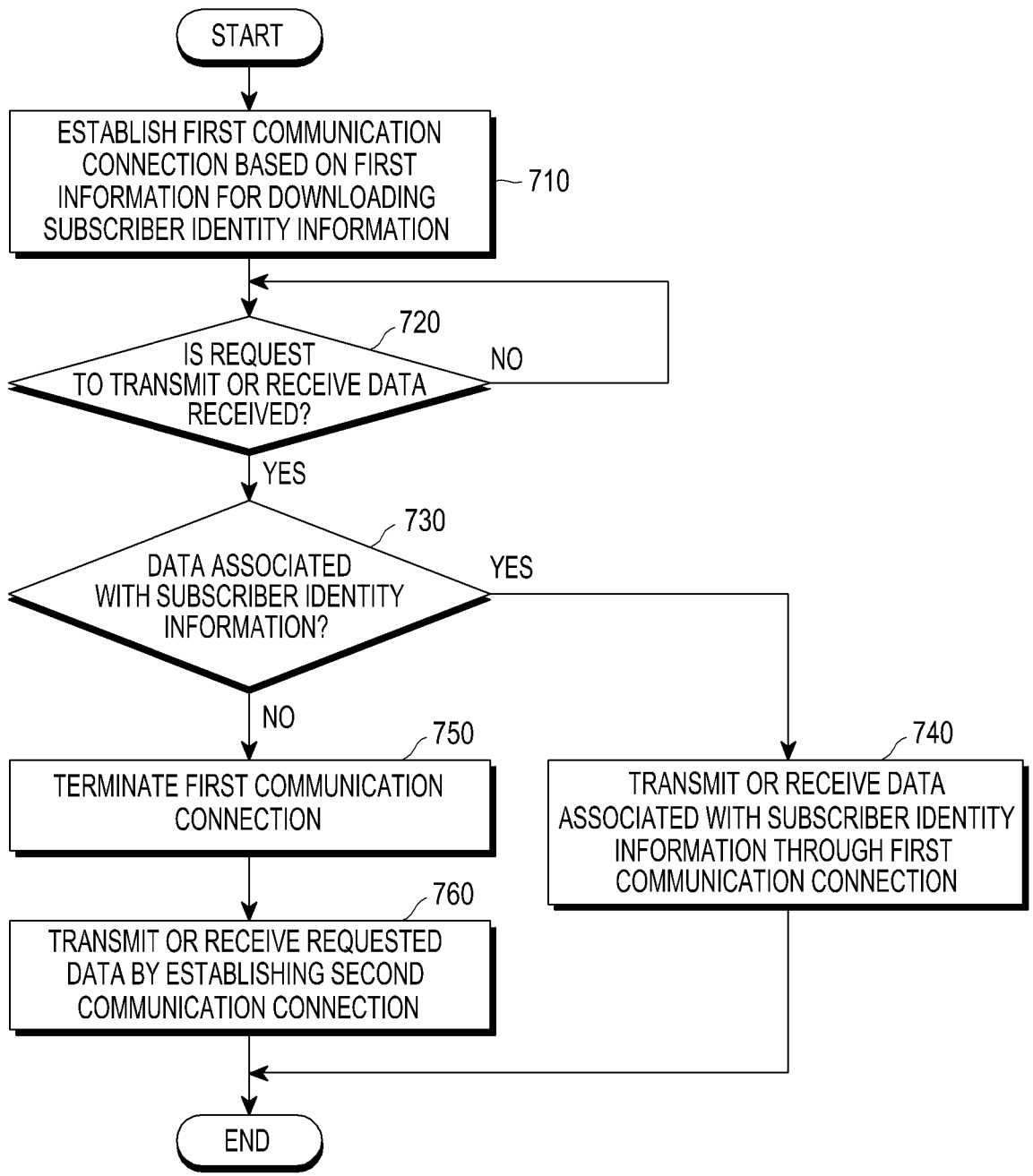
FIG. 7 is a flowchart illustrating an example operation in which an electronic device provides a communication service based on a subscriber identity information according to various example embodiments.

FIG. 7 is a flowchart illustrating an example operation in which an electronic device provides a communication service based on an IMSI according to various example embodiments.

Operations 710, 720, 730, 740, 750 and 760 according to various example embodiments may, for example, be understood as operations implemented by a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, or the electronic device 400 in FIG. 4).

Referring to FIG. 7, according to various example embodiments, in operation 710, the processor 310 may perform (e.g., establish) a first communication connection based on first information for downloading at least one IMSI to a subscriber identity module (e.g., the eUICC 201 in FIG. 2, the eUICC 301 in FIG. 3, the eUICC 401 in FIG. 4, or the eUICC 501 in FIG. 5). According to an example embodiment, the processor 310 may establish the first communication connection based on the first information for downloading a profile (e.g., first data or a first operational profile) including a first According to various example embodiments, the first information may be a provisioning profile. According to an example embodiment, the processor 310 may enable the provisioning profile included in the eUICC 301 using an LPA 312, thereby establishing the first communication connection with at least one external server (e.g., the SM-DS server 210 or the SM-DP+ server 220 in FIG. 2) for downloading the first operational profile. For example, the provisioning profile may include communication session information for the first communication connection designated for downloading the first operational profile. For example, the communication session information may include access information about at least one external server (e.g., the SM-DS server 210 or the SM-DP+ server 220 in FIG. 2) for downloading the first operational profile and may include information about an MNO network that is available free of charge for access to the at least one external server.

According to various example embodiments, when there is a request to transmit or receive data (Yes) in operation 720, the processor 310 may determine whether the data requested to be transmitted or received is data associated with downloading of the first IMSI in operation 730. According to an example embodiment, the processor 310 may determine whether the data requested to be transmitted or received is data associated with downloading of the first IMSI (or data not associated with downloading of the first IMSI). According to an example embodiment, the data associated with downloading of the first IMSI may be the first operational profile including the first IMSI. According to an example embodiment, the data not associated with downloading of the first IMSI may be data associated with a communication service via a wireless communication network. According to an example embodiment, the data not associated with downloading of the first IMSI may include another profile (or data) not including the first IMSI. For example, the other profile (or data) not including the first IMSI may include a profile (or data) associated with data by an application, a notification, a push, a link, or a service request by various service servers (e.g., the communication service server 240 in FIG. 2), such as a server associated with each of various applications, a push server, a search server, or a market server.

According to various example embodiments, when the data requested to be transmitted or received is data associated with at least one IMSI (e.g., the first IMSI (Yes in operation 730), the processor 310 may download data including the first IMSI through the first communication connection in operation 740. According to an example embodiment, the processor 310 may communicate with at least one external server (e.g., the SM-DS server 210 or the SM-DP+ server 220 in FIG. 2) via the communication module 330, thereby downloading the first operational profile including the first IMSI from a designated server (e.g., the SM-DP+ server 220 in FIG. 2).

According to various example embodiments, when the data requested to be transmitted or received is not data associated with at least one IMSI (e.g., the first operational profile including the first IMSI) (No in operation 730), the processor 310 may terminate the first communication connection in operation 750.

Figure 8:
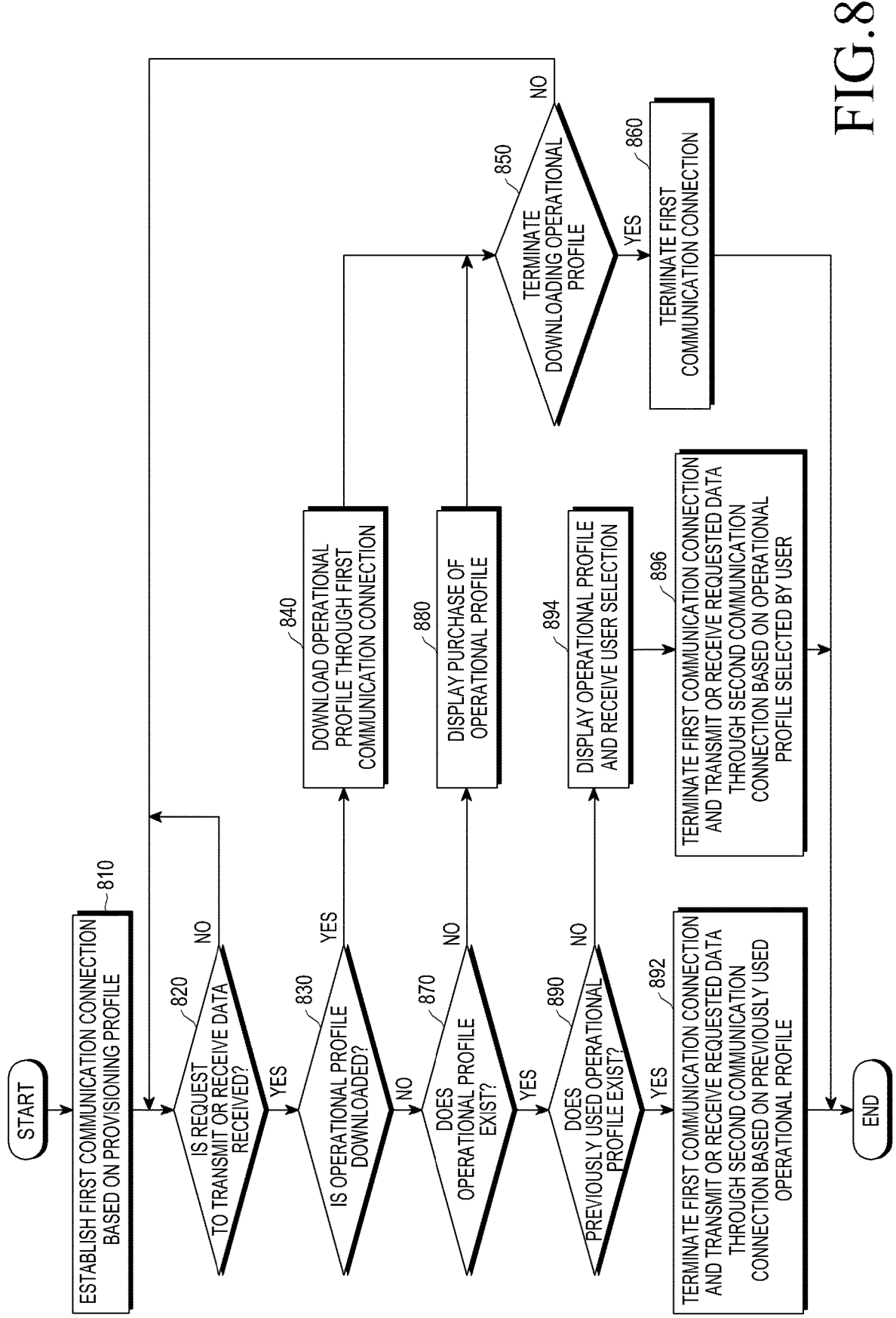
FIG. 8 is a flowchart illustrating an example operation in which an electronic device provides a communication service based on a profile according to various example embodiments.

According to various example embodiments, after terminating the first communication connection, the processor 310 may establish a second communication connection based on an IMSI (e.g., a second IMSI) and may transmit or receive the requested data in operation 760. According to various example embodiments, when the data requested to be transmitted or received is not data associated with downloading of the first operational profile, the processor 310 may disable the provisioning profile in the eUICC 301, may enable a second operational profile stored in the eUICC 301, and may establish the second communication connection based on the second operational profile. For example, data (or a profile) associated with a communication service other than downloading of the first operational profile may be data (or a profile) provided by various service servers (e.g., the communication service server 240 in FIG. 2), such as, for example, and without limitation, a server associated with each of various applications, a push server, a search server, a market server, or the like, and may include, for example, and without limitation, application data, notification data, push data, link data, service request data, or the like. FIG. 8 is a flowchart illustrating an example operation in which an electronic device provides a communication service based on a profile according to various example embodiments.

Operations 810, 820, 830, 840, 850, 860, 870, 880, 890, 892, 894 and 896 according to various example embodiments may be understood as operations implemented by a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, or the electronic device 400 in FIG. 4).

Referring to FIG. 8, according to various example embodiments, the processor 310 may establish a first communication connection based on a provisioning profile for downloading an operational profile (e.g., first data or a first operational profile) in operation 810. According to an example embodiment, the processor 310 may enable the provisioning profile included in the eUICC 301 using the LPA 312 and may establish the first communication connection with at least one external server (e.g., the SM-DS server 210 or the SM-DP+ server 220 in FIG. 2) for downloading at least one operational profile (e.g., the first operational profile). For example, the provisioning profile may include communication session information for the first communication connection designated for downloading at least one operational profile (e.g., the first operational profile). For example, the communication session information may include access information about at least one external server (e.g., the SM-DS server 210 or the SM-DP+ server 220 in FIG. 2) for downloading the first operational profile, and may include information about an MNO network that is available free of charge for access to the at least one external server.

According to various example embodiments, when there is a request to transmit or receive data (Yes) in operation 820, the processor 310 may determine whether the data requested to be transmitted or received is data associated with downloading of the operational profile (e.g., the first operational profile) in operation 830. According to an example embodiment, when the data requested to be transmitted or received is data associated with downloading of the first operational profile, the processor 310 may download the first operational profile through the first communication connection in operation 840. According to an example embodiment, the processor 310 may download the first operational profile from an SM-DP+ server (e.g., the SM-DP+ server 220 in FIG. 2) via the communication module 330.

According to various example embodiments, when there is a request to terminate downloading the operational profile (e.g., the first operational profile) in operation 850, the processor 310 may terminate the first communication connection in operation 860. According to an example embodiment, when receiving a request to terminate downloading the first operational profile from a user or receiving a request to terminate downloading the operational profile due to completion of downloading of the first operational profile, the processor 310 may disable the provisioning profile in the eUICC 301 and may terminate the first communication connection. According to an example embodiment, when there is no request to terminate downloading the first operational profile, the processor 310 may maintain the first communication connection.

According to various example embodiments, when the data requested to be transmitted or received is data not associated with downloading of the operational profile (e.g., the first operational profile) (No in operation 830), the processor 310 may determine whether there is an operational profile (e.g., a second operational profile) in the eUICC 301 in operation 870.

According to an example embodiment, the data not associated with downloading of the first operational profile may be data associated with a communication service through a wireless communication network. According to an example embodiment, a profile (or data) not associated with downloading of the first operational profile may include a profile (or data) associated with data by an application, a notification, a push, a link, or a service request by various service servers (e.g., the communication service server 240 in FIG. 2), such as a server associated with each of various applications, a push server, a search server, or a market server. According to various example embodiments, when there is no operational profile (e.g., no second operational profile) (No in operation 870), the processor 310 may display a screen for purchasing an operational profile (e.g., the second operational profile) in operation 880. According to various example embodiments, the processor 310 may display information indicating that there is no second operational profile on the display 340, may access a site for purchasing the second operational profile, and may display a screen for purchasing the second operational profile. According to an example embodiment, the processor 310 may display only the information indicating that there is no second operational profile, or may display only the screen for purchasing the second operational profile.

According to various example embodiments, when there is an operational profile (e.g., the second operational profile) (Yes in operation 870), the processor 310 may determine whether there is a previously used operational profile in operation 890. For example, the processor 310 may determine the most recently used operational profile based on the usage record of at least one operational profile stored in the eUICC 301.

According to various example embodiments, when there is a previously used operational profile (Yes in operation 890), the processor 310 may terminate the first communication connection, may establish a second communication connection based on the previously used operational profile, and may transmit or receive the requested data in operation 892. According to an example embodiment, when there is a previously used operational profile, the processor 310 may terminate the first communication connection by disabling the provisioning profile in the eUICC 301, may enable the previously used operational profile, and may establish the second communication connection based on the enabled operational profile, thereby transmitting or receiving the requested data.

According to various example embodiments, when there is no previously used operational profile (No in operation 890), the processor 310 may display at least one existing operational profile and may receive a user selection in operation 894.

According to various example embodiments, the processor 310 may terminate the first communication connection, may establish the second communication connection based on an operational profile selected by the user, and may transmit or receive the requested data in operation 896. According to an example embodiment, the processor 310 may terminate the first communication connection by disabling the provisioning profile in the eUICC 301, may enable the operational profile selected by the user, and may establish the second communication connection based on the enabled operational profile, thereby transmitting or receiving the requested data.

Figure 9:
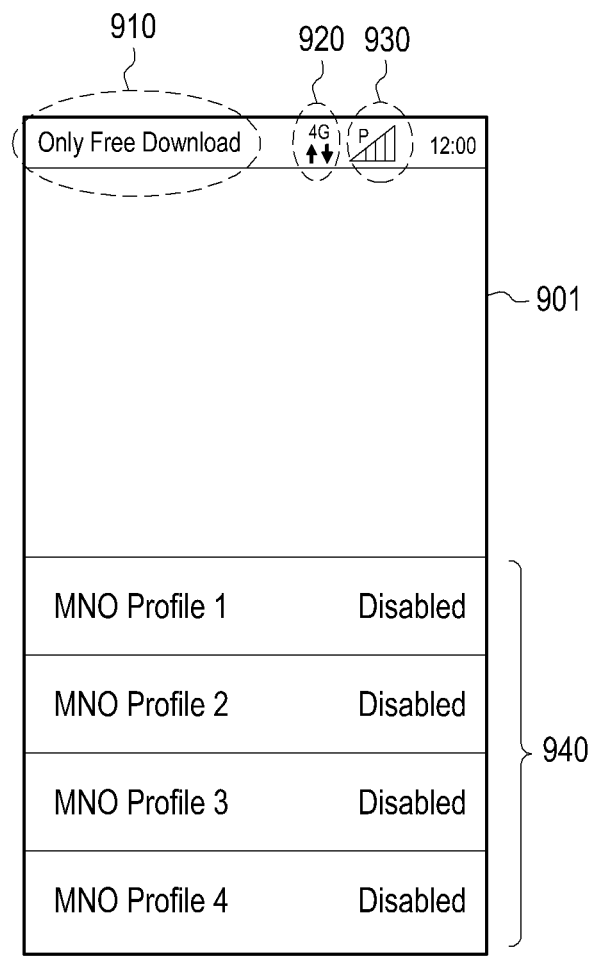
FIG. 9 is a diagram illustrating an example screen indicating that a first communication connection based on a provisioning profile is being used according to various example embodiments.

FIG. 9 is a diagram illustrating an example of a screen indicating that a first communication connection based on a provisioning profile is being used according to various example embodiments.

Referring to FIG. 9, a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, or the electronic device 400 in FIG. 4) may display information indicating that the electronic device 400 is using the first communication connection based on the provisioning profile on a screen 901 of a display (e.g., the display device 160 in FIG. 1 or the display 340 in FIG. 3).

According to various example embodiments, the information indicating that the first communication connection based on the provisioning profile is being used may include at least one of a Service Provider Name (SPN) 910, a Radio Access Technology (RAT) 920, and a Received Signal Strength Indicator (RSSI) 930. According to various example embodiments, the electronic device may further indicate, on the screen 901 of the display, that at least one operational profile 940 (e.g., a second operational profile) stored in an eUICC is disabled.

FIG. 10A is a diagram illustrating an example of displaying an SPN when a first communication connection based on a provisioning profile is being used according to various example embodiments, FIG. 10B is a diagram illustrating an example of displaying an RSSI when the first communication connection based on the provisioning profile is being used according to various example embodiments, and FIG. 10C is a diagram illustrating an example of displaying an RAT when the first communication connection based on the provisioning profile is being used according to various example embodiments.

Referring to FIG. 10A, when the first communication connection based on the provisioning profile is being used, a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, or the electronic device 400 in FIG. 4) may display the SPN as at least one of 'Only Free Download (or Free Download)', 'Only Profile Market (or Profile Market)', 'Only Profile Download (or Profile Download)', and 'Only SIM Download (or SIM Download)'. In addition, other indications for indicating that the first communication connection based on the provisioning profile is being used are also possible.

Referring to FIG. 10B, when the first communication connection based on the provisioning profile is being used, the processor 310 may display the RSSI as at least one of 'P', 'F', '?', or '!'. In addition, other indications for indicating that the first communication connection based on the provisioning profile is being used are also possible.

Referring to FIG. 10C, when the first communication connection based on the provisioning profile is being used, the processor 310 may display the RAT as 'Free[+]' or 'Provisioning' or in different colors. In addition, other indications for indicating that the first communication connection based on the provisioning profile is being used are also possible.

According to various example embodiments, a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, or the electronic device 400 in FIG. 4) may store and manage a list of a profile (e.g., a second operational profile) present in an eUICC (e.g., the subscriber identity module 196 in FIG. 1, the eUICC 201 in FIG. 2, the eUICC 301 in FIG. 3, or the eUICC 401 in FIG. 4, among which the eUICC 301 in FIG. 3 is illustrated in the following description).

For example, the profile list present in the eUICC 301 may be stored and managed using a table, for example, Table 1 below.

TABLE 1

| Profile class | Profile name | ICCID | Last-enabled operational profile |
|---|---|---|---|
| Operational | MNO1 | 89000000000000000011 | TRUE |
| Operational | MNO2 | 89000000000000000022 | FALSE |
| Operational | MNO3 | 89000000000000000033 | FALSE |

According to various example embodiments, a plurality of operational profiles may exist in the eUICC 301 as in Table 1, and the processor 310 may manage a profile class, a profile name, an ICCID, and a last-enabled operational profile with respect to each of the plurality of operational profiles. For example, the profile class may include information indicating whether a profile is a provisioning profile or an operational profile. The profile name may include the name of an MNO or a communication service associated with a profile. The ICCID may include profile identification information. The last-enabled operational profile may include information about whether each operational profile is the last-enabled operational profile. According to various example embodiments, the processor 310 may determine, using the profile list, whether there is an operational profile in the eUICC 301 and whether the operational profile is the last-enabled operational profile.

Figure 11:
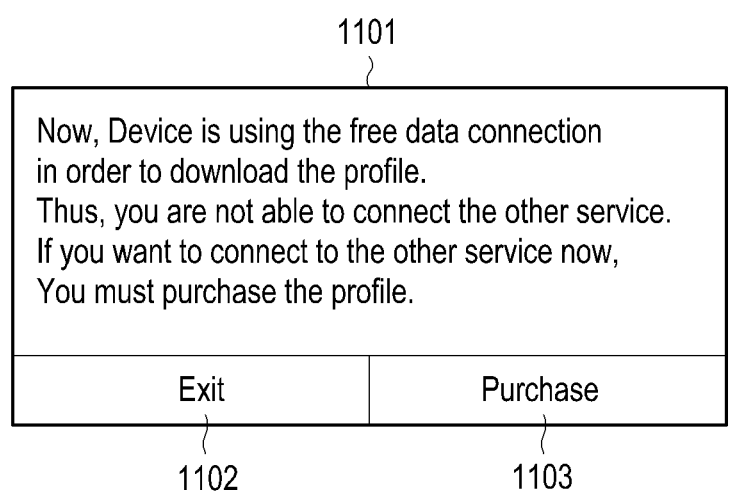
FIG. 11 is a diagram illustrating an example in which an electronic device displays information indicating that no operational profile exists according to various example embodiments.

FIG. 11 is a diagram illustrating an example in which an electronic device displays information indicating that no operational profile exists according to various example embodiments.

Referring to FIG. 11, when there is a request to transmit or receive data not associated with profile downloading from a user, if there is no operational profile in an eUICC (e.g., the subscriber identity module 196 in FIG. 1, the eUICC 201 in FIG. 2, the eUICC 301 in FIG. 3, or the eUICC 401 in FIG. 4, among which the eUICC 301 in FIG. 3 is illustrated in the following description), a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, or the electronic device 400 in FIG. 4) may display information 1101 indicating that there is no operational profile on a display (e.g., the display device 160 in FIG. 1 or the display 340 in FIG. 3). For example, the transmission or reception of data not associated with profile downloading may be data transmission and reception, notification reception, push reception, link reception and connection, or transmission or reception of data associated with a service request by an application. According to an example embodiment, the information 1101 indicating that there is no operational profile may be displayed along with an Exit button 1102 and a Purchase button 1103 to request the purchase of an operational profile. When the Exit button 1102 is selected by the user, the processor 310 may ignore the request to transmit or receive the data not associated with profile downloading. When the Purchase button 1103 is selected by the user, the processor 310 may display a purchase screen by accessing a designated purchase site while maintaining a first communication connection based on a provisioning profile.

Figure 12A:
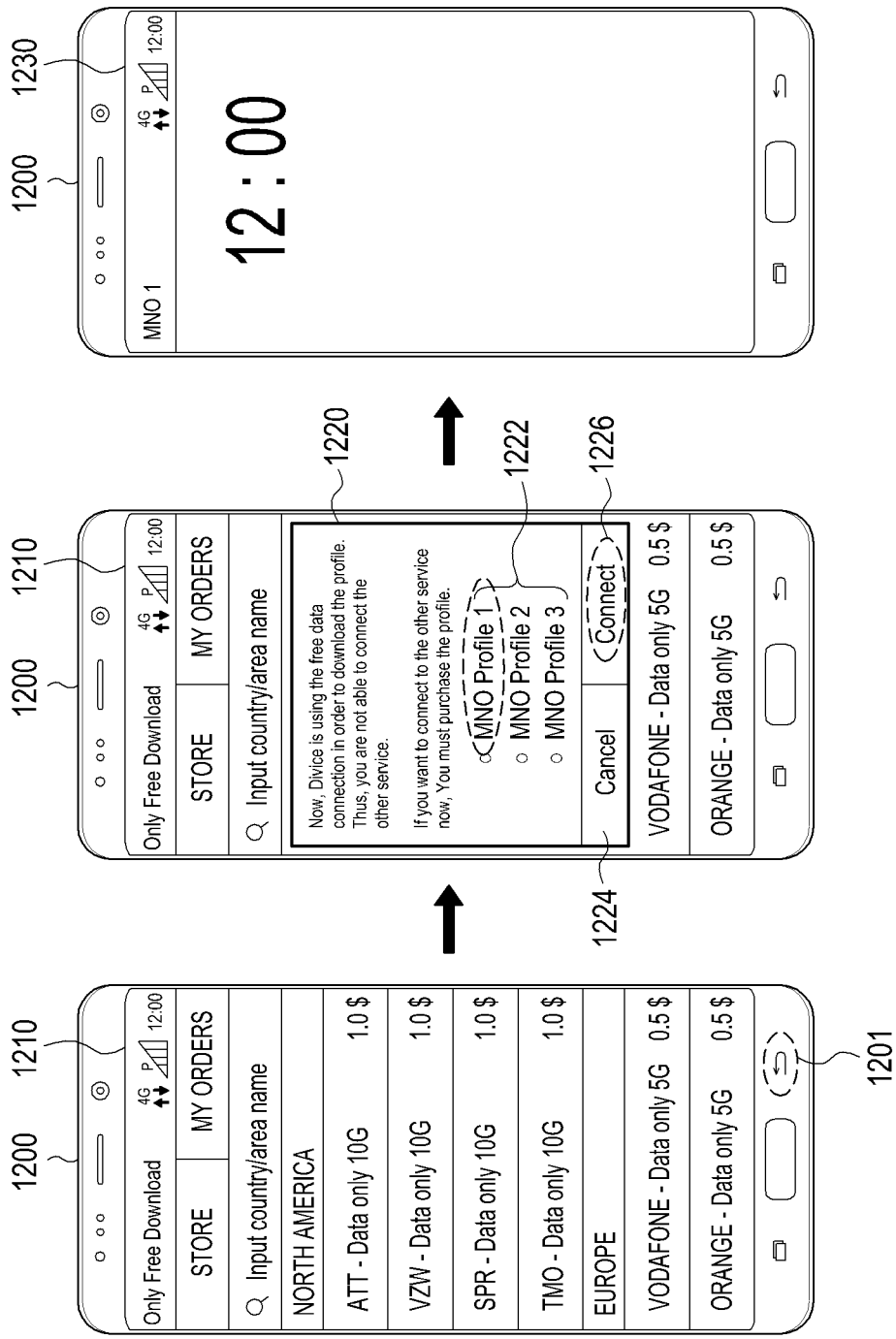
FIG. 12A is a diagram illustrating an example in which an electronic device displays an operational profile purchase screen according to various example embodiments.
Figure 12B:
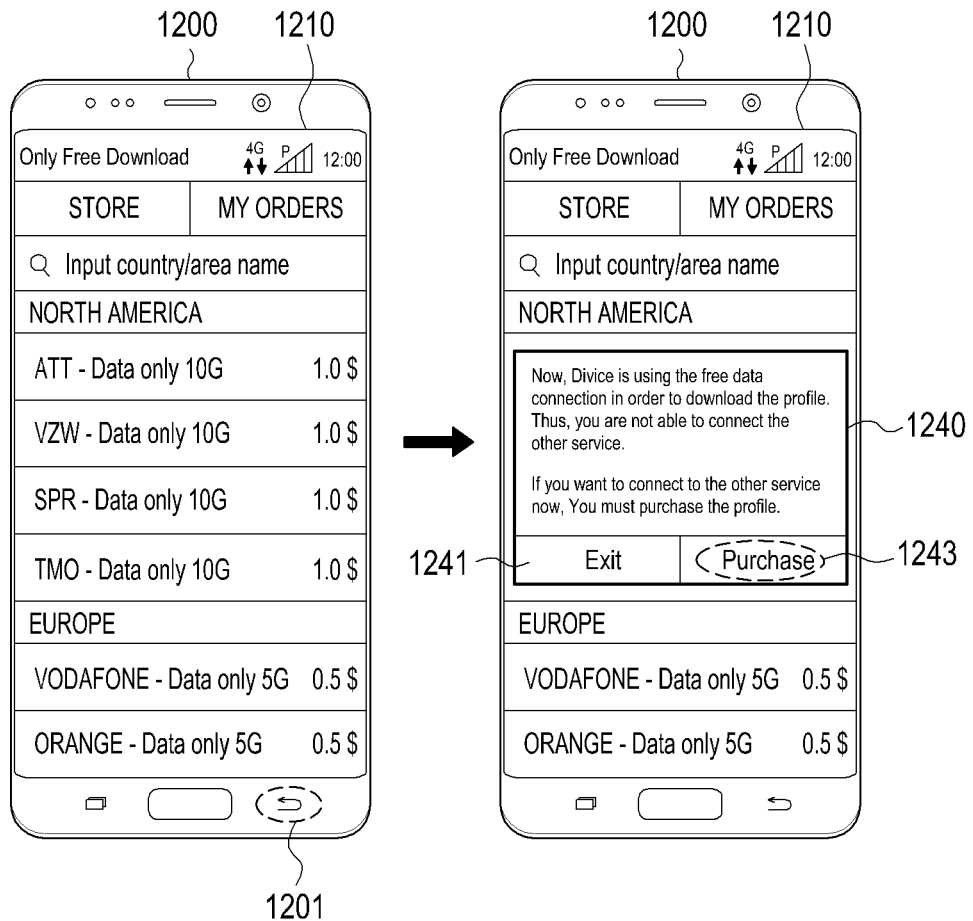
FIG. 12B is a diagram illustrating an example in which an electronic device displays an operational profile purchase screen according to various example embodiments.

FIG. 12A is a diagram illustrating an example in which an electronic device displays an operational profile purchase screen according to various example embodiments, and FIG. 12B is a diagram illustrating an example in which an electronic device displays an operational profile purchase screen according to various example embodiments.

Referring to FIG. 12A and FIG. 12B, when a purchase request is received from a user (e.g., when the Purchase button 1103 in FIG. 11 is selected) with a first communication connection based on a provisioning profile maintained, the electronic device 1200 (e.g., the electronic device 100 in FIG. 1, the electronic device 200 in FIG. 2, the electronic device 300 in FIG. 3, or the electronic device 400 in FIG. 4) may access a designated purchase site and may display an operational profile purchase screen 1210. For example, the operational profile purchase screen 1210 may display the name and the price of each of at least one purchasable operational profile. The user may select and purchase at least one of the at least one purchasable operational profile or may terminate displaying the purchase screen 1210 by selecting Cancel 1201. For example, when the display of the purchase screen 1210 is terminated, the provisioning profile may be disabled and the first communication connection based on the provisioning profile may be terminated.

When the user selects to cancel the display of the operational profile purchase screen 1210, the electronic device 1200 may display a first pop-up window 1220 in FIG. 12A or a second pop-up window 1240 in FIG. 12B on a display depending on whether there is an operational profile in an eUICC before terminating the first communication connection based on the provisioning profile.

According to an example embodiment, when there is an operational profile (e.g., a second operational profile), the electronic device 1200 may display information 1222 about the existing operational profile, a Cancel button 1224, and a Connect button 1226 through the first pop-up window 1220 in FIG. 12A. When the user selects the operational profile, for example, MNO1, and selects the Connect button 1226, the electronic device 1200 may establish a second communication connection based on the selected operational profile and may display a screen 1230 indicating that the second communication connection is being used. When the user selects the Cancel button 1224, the electronic device 1200 may disable the provisioning profile and may terminate the first communication connection based on the provisioning profile, thereby being in a no-profile state.

According to an example embodiment, when there is no operational profile, the electronic device 1200 may display information indicating that there is no operational profile, an Exit button 1241, and a Purchase button 1243 through the second pop-up window 1240 in FIG. 12B. When the user selects the Exit button 1241, the electronic device 1200 may disable the provisioning profile and may terminate the first communication connection based on the provisioning profile, thereby being in the no-profile state. When the user selects the Purchase button 1243, the electronic device 1200 may display the operational profile purchase screen 1210 again.

Figure 13A:
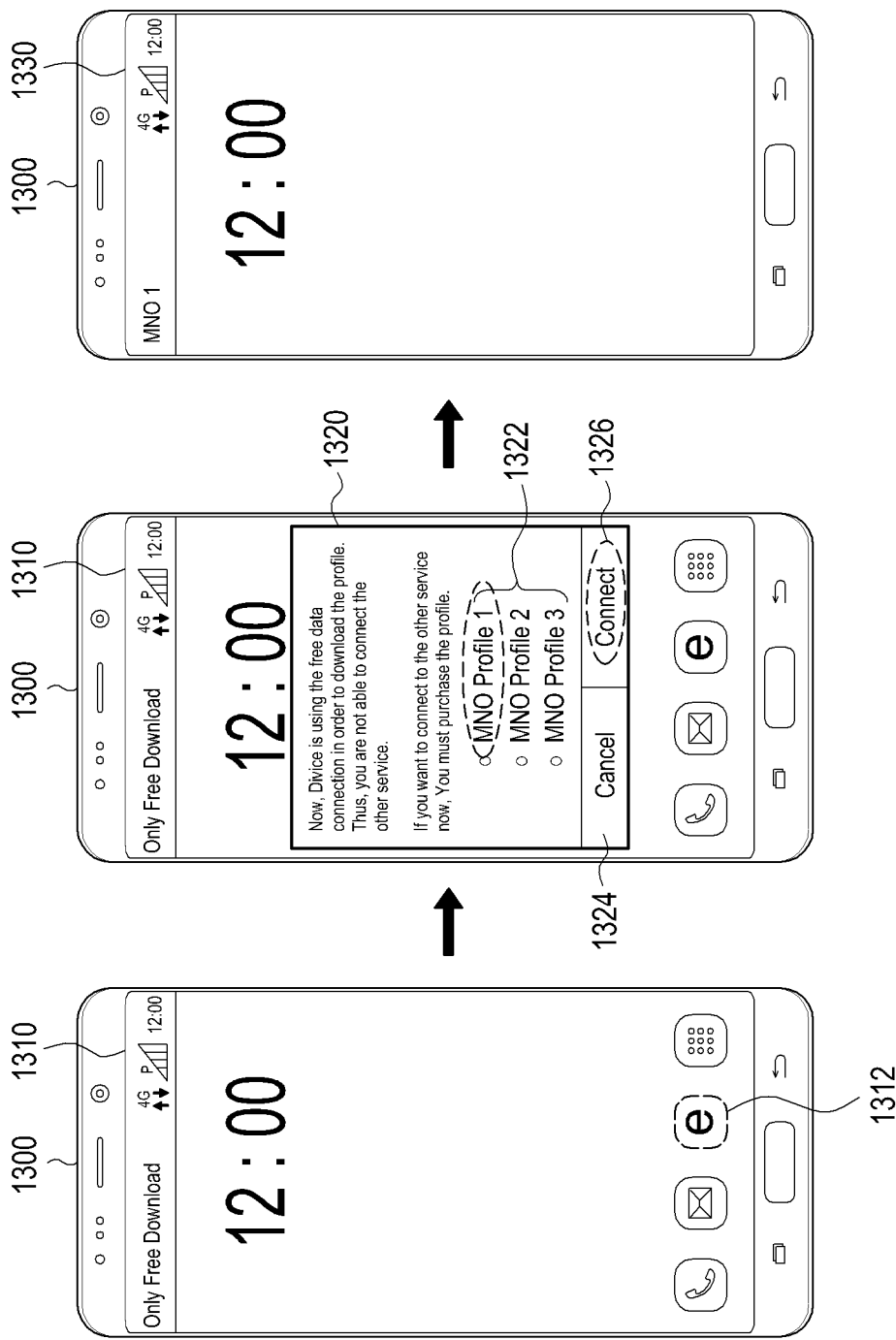
FIG. 13A is a diagram illustrating an example in which an electronic device displays a screen when there is a request for a communication service other than downloading of an operational profile during a first communication connection based on a provisioning profile according to various example embodiments.
Figure 13B:
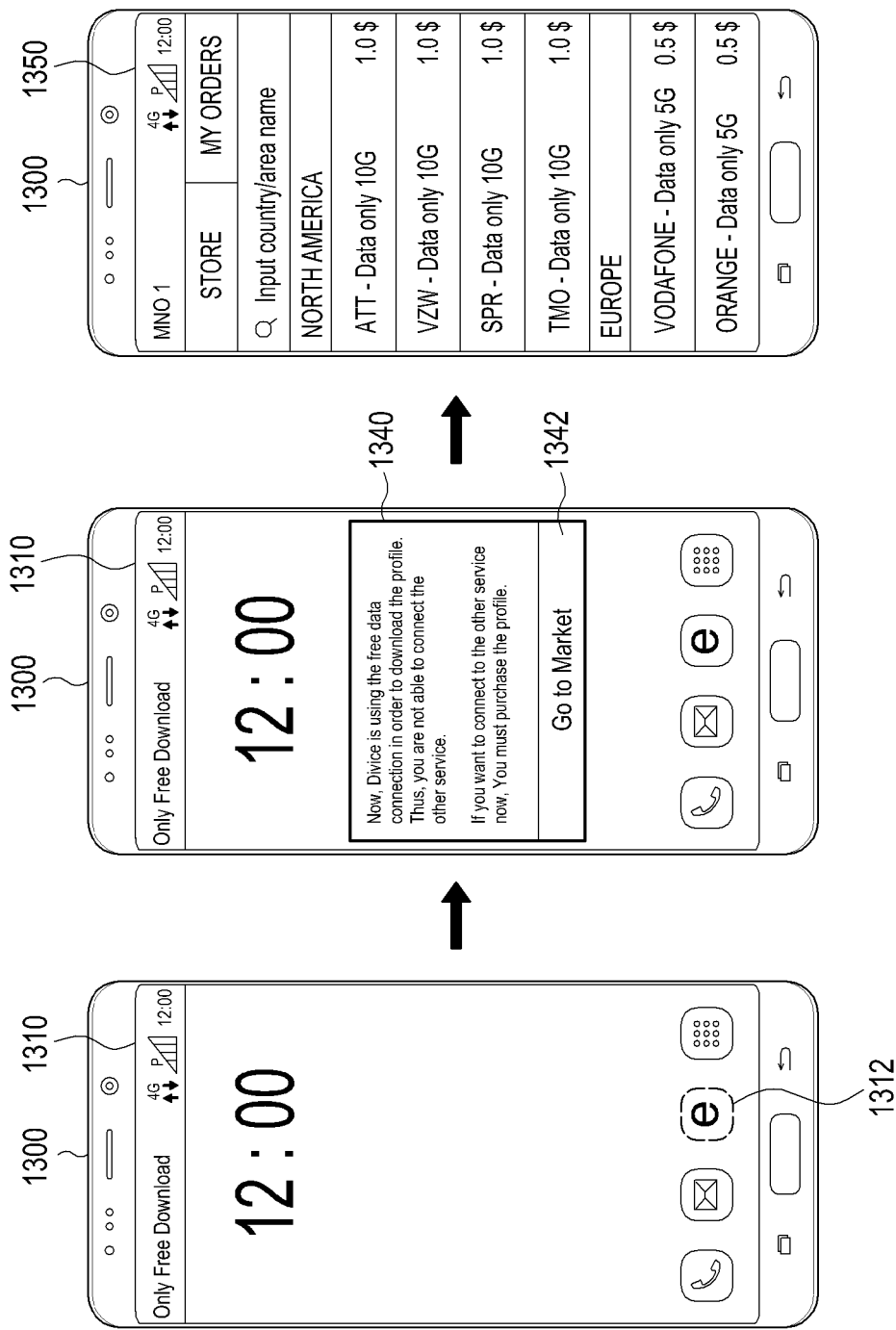
FIG. 13B is a diagram illustrating an example in which an electronic device displays a screen when there is a request for a communication service other than downloading of an operational profile during a first communication connection based on a provisioning profile according to various example embodiments.

FIG. 13A is a diagram illustrating an example in which an electronic device displays a screen when there is a request for a communication service other than downloading of an operational profile (e.g., a first operational profile) during a first communication connection based on a provisioning profile according to various example embodiments, and FIG. 13B is a diagram illustrating an example in which an electronic device displays a screen when there is a request for a communication service other than downloading of an operational profile (e.g., a first operational profile) during a first communication connection based on a provisioning profile according to various example embodiments.

Referring to FIG. 13A and FIG. 13B, when a request for a communication service, for example, an Internet service 1312, other than downloading of an operational profile (e.g., a first operational profile) is received from a user on a screen 1310 with a first communication connection based on a provisioning profile maintained, the electronic device 1300 (e.g., the electronic device 100 in FIG. 1, the electronic device 200 in FIG. 2, the electronic device 300 in FIG. 3, the electronic device 400 in FIG. 4, or the electronic device 1200 in FIG. 12A and FIG. 12B) may display a first pop-up window 1320 in FIG. 13A or a second pop-up window 1340 in FIG. 13B on a display depending on whether there is an operational profile (e.g., a second operational profile) in an eUICC.

According to an example embodiment, when there is an operational profile (e.g., a second operational profile), the electronic device 1300 may display information 1322 about the existing operational profile, a Cancel button 1324, and a Connect button 1326 through the first pop-up window 1320 in FIG. 13A. When the user selects the operational profile, for example, MNO1, and selects the Connect button 1326, the electronic device 1300 may establish a second communication connection based on the selected operational profile, MNO1, and may provide the Internet service through a screen 1330 indicating that the second communication connection is being used. When the user selects the Cancel button 1324, the electronic device 1300 may disable the provisioning profile and may terminate the first communication connection based on the provisioning profile, thereby being in a no-profile state.

According to an example embodiment, when there is no operational profile, the electronic device 1300 may display information indicating that there is no operational profile and a Go to Market button 1342 through the second pop-up window 1340 in FIG. 13B. When the user selects the Go to Market button 1342, the electronic device 1300 may access an operational profile purchase site and may display an operational profile purchase screen 1350 while maintaining the first communication connection based on the provisioning profile. According to various example embodiments, the operation of displaying the information indicating that there is no operational profile and the Go to Market button 1342 through the second pop-up window 1340 in FIG. 13B may be performed upon receiving consent of the user.

According to various example embodiments, when a first communication connection based on a provisioning profile is not needed, an electronic device (e.g., the electronic device 100 in FIG. 1, the electronic device 200 in FIG. 2, the electronic device 300 in FIG. 3, the electronic device 400 in FIG. 4, the electronic device 1200 in FIG. 12A and FIG. 12B, or the electronic device 1300 of FIG. 13A and FIG. 13B) may download an operational profile using a QR code or may download an operational profile (e.g., a first operational profile) using Wi-Fi or the like.

Figure 14:
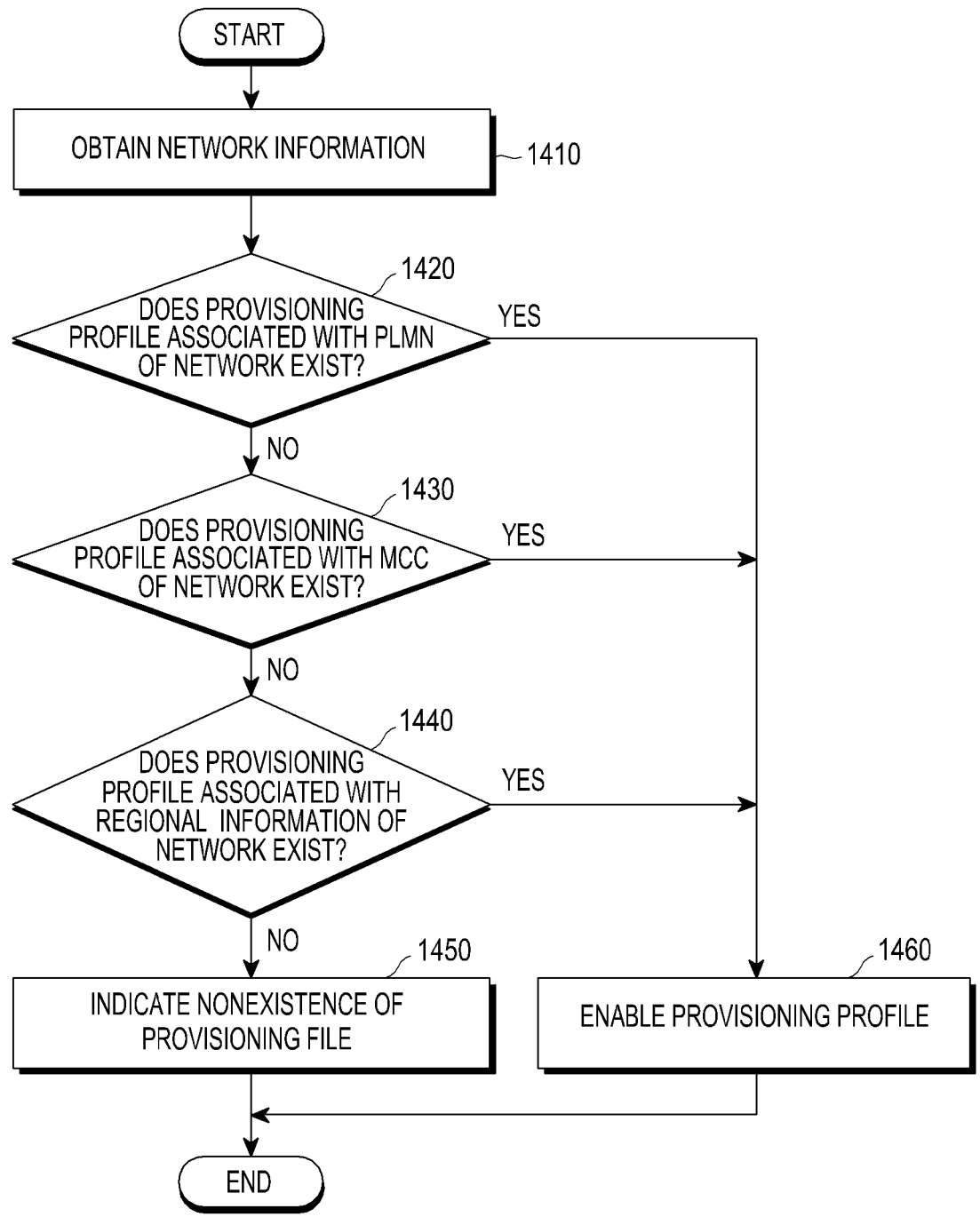
FIG. 14 is a flowchart illustrating an example operation in which an electronic device enables a provisioning profile when there are a plurality of provisioning profiles according to various example embodiments.

FIG. 14 is a flowchart illustrating an example operation in which an electronic device enables a provisioning profile when there is a plurality of provisioning profiles according to various example embodiments.

Operations 1410, 1420, 1430, 1440, 1450 and 1460 according to various example embodiments may be understood as operations implemented by a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, the electronic device 400 in FIG. 4, the electronic device 1200 in FIG. 12A and FIG. 12B, or the electronic device 1300 of FIG. 13A and FIG. 13B).

Referring to FIG. 14, according to various example embodiments, the processor 310 may obtain network information in operation 1410. For example, the processor 310 may obtain information about a network to which the electronic device 1400 is currently connected when power is turned on or when there is a request to download an operational profile (e.g., a first operational profile). According to various example embodiments, the network information may include Public Land Mobile Network (PLMN) information, Mobile Country Code (MCC) information, and regional information about the network. For example, the PLMN information may include a network identification number of an operator, the MCC information may include a code for identifying a country, and the regional information may include information about a group including a plurality of countries.

According to various example embodiments, the processor 310 may determine whether there is a provisioning profile associated with the PLMN information about the network in an eUICC in operation 1420. For example, the processor 310 may determine whether there is a provisioning profile associated with the PLMN information about the network based on a provisioning profile list installed in the eUICC. According to various example embodiments, the provisioning profile list may be updated during the installation of a provisioning profile, or may be stored before the release of the electronic device. According to an example embodiment, the provisioning profile list may include a profile class, an ICCID, an MCC, an MNC, and regional information with respect to each of a plurality of provisioning profiles installed in the eUICC.

According to various example embodiments, when there is no provisioning profile associated with the PLMN information about the network in the eUICC (No in operation 1420), the processor 310 may determine whether there is a provisioning profile associated with the MCC information about the network in the eUICC in operation 1430.

According to various example embodiments, when there is no provisioning profile associated with the MCC information about the network in the eUICC (No in operation 1430), the processor 310 may determine whether there is a provisioning profile associated with the regional information about the network in the eUICC in operation 1440.

According to various example embodiments, when there is no provisioning profile associated with the regional information about the network in the eUICC (No in operation 1440), the processor 310 may indicate that there is no provisioning profile in operation 1450.

According to various example embodiments, when there is a provisioning profile associated with the PLMN information about the network in the eUICC (Yes in operation 1420), when there is a provisioning profile associated with the MCC information about the network in the eUICC (Yes in operation 1430), or when there is a provisioning profile associated with the regional information about the network in the eUICC (Yes in operation 1440), the processor 310 may enable the provisioning profile in operation 1460. According to various example embodiments, the processor 310 may download an operational profile based on the enabled provisioning profile.

According to various example embodiments, a processor (e.g., the processor 120 in FIG. 1, the processor 310 in FIG. 3, or the processor 410 in FIG. 4, among which the processor 310 in FIG. 3 is illustrated in the following description) of an electronic device (e.g., the electronic device 100 in FIG. 1, the electronic device 200 in FIG. 2, the electronic device 300 in FIG. 3, the electronic device 400 in FIG. 4, the electronic device 1200 in FIG. 12A and FIG. 12B, or the electronic device 1300 of FIG. 13A and FIG. 13B) may store and manage a profile list present in an eUICC (e.g., the subscriber identity module 196 in FIG. 1, the eUICC 201 in FIG. 2, the eUICC 301 in FIG. 3, or the eUICC 401 in FIG. 4, among which the eUICC 301 in FIG. 3) is illustrated in the following description.

According to various example embodiments, a plurality of provisioning profiles may exist in the eUICC 301, and the profile list may be updated during the installation of a provisioning profile, or may be stored before the release of the electronic device.

For example, the provisioning profile list existing in the eUICC 301 may be stored and managed using a table, for example, Table 2 below.

TABLE 2

| Profile class | ICCID | MCC | MNC | Regional information |
|---|---|---|---|---|
| Provisioning | 89000000000000000099 | 208 | 99 | Europe |
| Provisioning | 89000000000000000088 | 301 | 88 | North America and the Caribbean |
| Provisioning | 89000000000000000077 | 450 | 77 | Asia |
| Provisioning | 89000000000000000066 | 724 | 66 | South and central America |
| Provisioning | 89000000000000000055 | 655 | 55 | Africa |

According to various example embodiments, the processor 310 may manage a profile class, an ICCID, an MCC, an MNC, and regional information with respect to each of the plurality of provisioning profiles, as in Table 2. For example, the profile class may include information indicating whether a profile is a provisioning profile or an operational profile. The ICCID may include profile identification information. The MCC may include the identification code of the country where the provisioning profile can be used. The MNC may include the identification code of a mobile network on which the provisioning profile can be used. The regional information may indicate information about the region where the provisioning profile can be used, and may include information on a plurality of grouped countries.

FIG. 15 is a diagram illustrating an example in which an electronic device displays a screen when there is no provisioning profile according to various example embodiments.

Referring to FIG. 15, when none of a provisioning profile associated with PLMN information about a network, a provisioning profile associated with MCC information about the network, and a provisioning profile associated with regional information about the network exists in the eUICC, the electronic device (e.g., the electronic device 100 in FIG. 1, the electronic device 200 in FIG. 2, the electronic device 300 in FIG. 3, the electronic device 400 in FIG. 4, the electronic device 1200 in FIG. 12A and FIG. 12B, or the electronic device 1300 of FIG. 13A and FIG. 13B) may display information 1510 indicating that there is no provisioning profile. For example, the information 1510 indicating that there is no provisioning profile may include information indicating that a first communication connection for downloading a profile (e.g., a first operational profile) cannot be established and information for inducing the use of another communication service (e.g., Wi-Fi communication) to download the profile (e.g., the first operational profile), and may include an OK button 1512 to receive a confirmation of the user. According to one example embodiment, when the OK button 1512 is selected by the user, the electronic device may cancel an operation of downloading an operational profile, or may perform an operation of connecting another communication service.

Each of the above-described component elements of hardware according to the disclosure may be configured with one or more components, and the names of the corresponding component elements may vary based on the type of electronic device. The electronic device according to various embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, refer to a unit including one of hardware, software, and firmware or any combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include, for example, and without limitation, at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command (e.g., an instruction) stored in a computer-readable storage medium in a programming module form. The instruction, when executed by a processor (e.g., the processor 120), may cause the processor to execute the function corresponding to the instruction. The computer-readable storage medium may be, for example, the memory 130.

According to various example embodiments, a non-transitory, computer-readable storage medium may store instructions, that, when executed by at least one circuit, cause the at least one circuit to perform at least one operation, and the at least one operation may include: performing a first communication connection based on first information associated with the first communication connection for downloading first data including at least first subscriber identity information to a subscriber identity module; and terminating the first communication connection and transmitting and/or receiving requested data by establishing a second communication connection based on a second subscriber identity information, upon receiving a request to transmit and/or receive the data not including the first subscriber identity information during the first communication connection.

The computer readable recoding medium may include, for example, and without limitation, a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may contain codes made by a compiler or a code executable by an interpreter. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

While the disclosure has been illustrated and described with reference to various example embodiments thereof, it will be understood by those skilled in the art that various changes in form and details may be made therein without departing from the spirit and scope of the disclosure as defined, for example, by the appended claims.

What is claimed is:

1. An electronic device comprising:
 a display;
 communication circuitry;
 a memory, comprising an embedded subscriber identity module comprising circuitry, configured to store first information associated with a first communication connection configured to download first data comprising first subscriber identity information by accessing at least one communication service providing server; and
 a processor operatively connected to the display, the communication circuitry, and the memory, wherein the processor is configured to:
  control the electronic device to perform the first communication connection for downloading the first data comprising the first subscriber identity information based on the first information using the communication circuitry; and
  based upon receiving a request to transmit and/or receive other data and based upon determining that the other data is not associated with the downloading of the first subscriber identity information during the first communication connection, terminate the first communication connection and transmit and/or receive the other data by performing a second communication connection based on a second subscriber identity information.

2. The electronic device of claim 1, wherein the first information comprises a provisioning profile, and the first data comprises a first operational profile.

3. The electronic device of claim 2, wherein the processor is configured to control the display to indicate that a second operational profile corresponding to the second subscriber identity information does not exist via the display when the second subscriber identity information does not exist in the subscriber identity module upon receiving the request to transmit and/or receive the other data during the first communication connection, and wherein the subscriber identity module comprises at least one of: an eUICC, USIM, eSIM, and/or SIM card.

4. The electronic device of claim 3, wherein the processor is further configured to control the display to display a purchase screen associated with the second operational profile when the second operational profile does not exist in the memory.

5. The electronic device of claim 3, wherein the processor is configured to control the electronic device to establish the second communication connection based on a previously used second operational profile.

6. The electronic device of claim 3, wherein the processor is configured to control the electronic device to establish the second communication connection based on the second operational profile, the second operational profile being selected by a user.

7. The electronic device of claim 2, wherein the processor is configured to control the display to display at least one indicator indicating the first communication connection based on the provisioning profile on the display.

8. The electronic device of claim 7, wherein the at least one indicator comprises at least one type among: a Service Provider Name (SPN), a Radio Access Technology (RAT), and a Received Signal Strength Indicator (RSSI).

9. The electronic device of claim 2, wherein the processor is configured to control the electronic device to select the provisioning profile associated with a network with which a connection is being performed via the communication circuitry.

10. The electronic device of claim 9, wherein the processor is configured to control the electronic device to select the provisioning profile associated with the network with which the connection is being performed via the communication circuitry based on at least one of: a PLMN identifier, an MCC, and regional information of the network with which the connection is being performed.

11. A method for controlling an electronic device to provide a communication service based on subscriber identity information, the method comprising:
  performing a first communication connection based on first information associated with the first communication connection for downloading first data comprising first subscriber identity information to a subscriber identity module; and
  based upon receiving a request to transmit and/or receive other data and based upon determining that the other data is not associated with downloading of the first subscriber identity information during the first communication connection, terminating the first communication connection and transmitting and/or receiving the other data by performing a second communication connection based on a second subscriber identity information.

12. The method of claim 11, wherein the first information comprises a provisioning profile, and the first data comprises a first operational profile.

13. The method of claim 12, further comprising:
  indicating that a second operational profile does not exist via a display when the second operational profile does not exist in the subscriber identity module, upon receiving the request to transmit and/or receive the other data during the first communication connection.

14. The method of claim 13, further comprising:
  displaying a purchase screen associated with the second operational profile when the second operational profile does not exist.

15. The method of claim 13, wherein a second communication session is established based on a previously used second operational profile when the previously used second operational profile exists in the subscriber identity module, and wherein the subscriber identity module comprises at least one of: an eUICC, USIM, eSIM, and/or SIM.

16. The method of claim 13, wherein a second communication session is established based on the second operational profile that is selected by a user when a plurality of operational profiles exists in the subscriber identity module.

17. The method of claim 12, further comprising:
  displaying at least one indicator indicating that the first communication connection based on the provisioning profile is being used on the display.

18. The method of claim 17, wherein the at least one indicator comprises at least one type among: a Service Provider Name (SPN), a Radio Access Technology (RAT), and a Received Signal Strength Indicator (RSSI).

19. The method of claim 12, further comprising:
  selecting the provisioning profile based on at least one of: a PLMN identifier, an MCC, and regional information of a network with which a connection is being performed via communication circuitry.

20. A non-transitory computer readable storage medium that stores instructions, which when executed by at least one circuit, cause the at least one circuit to perform at least one operation, the at least one operation comprising:
  performing a first communication connection based on first information associated with the first communication connection for downloading first subscriber identity information to a subscriber identity module; and
  based upon receiving a request to transmit and/or receive other data and based upon determining that the other data is not including the first subscriber identity information, during the first communication connection, terminating the first communication connection and transmitting and/or receiving the other data by performing a second communication connection based on a second subscriber identity information.

* * * * *